(12) United States Patent
Janik et al.

(10) Patent No.: US 7,768,234 B2
(45) Date of Patent: *Aug. 3, 2010

(54) SYSTEM AND METHOD FOR AUTOMATICALLY SYNCHRONIZING AND ACQUIRING CONTENT FOR BATTERY POWERED DEVICES

(76) Inventors: Craig M. Janik, 25566 Fernhill Dr., Los Altos Hills, CA (US) 94024; Nicholas Kalayjian, 164 Winding Way, San Carlos, CA (US) 94070; Jonathan L. Nichols, 232 San Jose Ave., Santa Cruz, CA (US) 95060; Axel Fuchs, 1172 Mountain Quail Cir., San Jose, CA (US) 95120

( * ) Notice: Subject to any disclaimer, the term of this patent is extended or adjusted under 35 U.S.C. 154(b) by 727 days.

This patent is subject to a terminal disclaimer.

(21) Appl. No.: 11/069,138

(22) Filed: Feb. 28, 2005

(65) Prior Publication Data

US 2005/0258806 A1 Nov. 24, 2005

Related U.S. Application Data

(60) Provisional application No. 60/548,411, filed on Feb. 28, 2004.

(51) Int. Cl.
*H02J 7/00* (2006.01)
*H02J 7/16* (2006.01)
(52) U.S. Cl. ............... 320/133; 320/106; 320/107; 320/132; 320/155; 320/157
(58) Field of Classification Search ......... 320/132, 320/133, 107, 106, 155, 157
See application file for complete search history.

(56) References Cited

U.S. PATENT DOCUMENTS

| 4,955,038 | A | 9/1990 | Lee et al. |
|---|---|---|---|
| 5,434,860 | A | 7/1995 | Riddle |
| 5,721,827 | A | 2/1998 | Logan et al. |
| 5,724,567 | A | 3/1998 | Rose et al. |
| 5,742,599 | A | 4/1998 | Lin et al. |
| 5,758,257 | A | 5/1998 | Herz et al. |

(Continued)

FOREIGN PATENT DOCUMENTS

EP 0 502 566 9/1992

(Continued)

OTHER PUBLICATIONS

PR Newswire, New Company Xenote Allows Consumers to 'Bookmark the Real World' with Fun, Personal Internet Device, Jan. 25, 2000, 2pgs.

(Continued)

*Primary Examiner*—Edward Tso
*Assistant Examiner*—Yalkew Fantu

(57) ABSTRACT

Various synchronization and content acquisition tasks able to be performed by a portable device are governed by reference to a budget. In operation, the budget may be adjusted as a function of a state of a battery associated with the portable device, as a function of one more file sizes associated with content to be acquired, as a function of a data transfer rate, and/or as a function of a temperature associated with the portable device. A filter may also be provided for use in determining which content the portable device will acquire.

37 Claims, 18 Drawing Sheets

U.S. PATENT DOCUMENTS

| | | | |
|---|---|---|---|
| 5,790,935 A | 8/1998 | Payton | |
| 5,793,980 A | 8/1998 | Glaser et al. | |
| 5,812,942 A | 9/1998 | Allen et al. | |
| 5,884,028 A | 3/1999 | Kindell et al. | |
| 5,926,624 A | 7/1999 | Katz et al. | |
| 5,991,306 A | 11/1999 | Burns et al. | |
| 6,005,566 A | 12/1999 | Jones et al. | |
| 6,169,387 B1 * | 1/2001 | Kaib | 320/132 |
| 6,263,491 B1 | 7/2001 | Hunt | |
| 6,263,503 B1 | 7/2001 | Margulis | |
| 6,433,515 B2 | 8/2002 | Sakakibara | |
| 6,434,747 B1 | 8/2002 | Khoo et al. | |
| 6,453,355 B1 | 9/2002 | Jones et al. | |
| 6,526,581 B1 | 2/2003 | Edson | |
| 6,678,215 B1 | 1/2004 | Treyz et al. | |
| 6,678,737 B1 | 1/2004 | Bucher | |
| 6,700,893 B1 | 3/2004 | Radha et al. | |
| 6,708,213 B1 | 3/2004 | Bommaiah et al. | |
| 6,717,952 B2 | 4/2004 | Jones et al. | |
| 6,744,763 B1 | 6/2004 | Jones et al. | |
| 6,794,849 B2 | 9/2004 | Mori et al. | |
| 6,826,283 B1 | 11/2004 | Wheeler et al. | |
| 6,829,648 B1 | 12/2004 | Jones et al. | |
| 6,834,195 B2 | 12/2004 | Brandenberg et al. | |
| 7,072,697 B2 | 7/2006 | Lappetelainen et al. | |
| 7,117,516 B2 | 10/2006 | Khoo et al. | |
| 7,191,242 B1 | 3/2007 | Serenyi et al. | |
| 7,366,788 B2 | 4/2008 | Jones et al. | |
| 2001/0035732 A1 * | 11/2001 | Sakakibara | 320/106 |
| 2002/0056112 A1 | 5/2002 | Dureau et al. | |
| 2002/0065564 A1 | 5/2002 | Sheriff et al. | |
| 2002/0066018 A1 | 5/2002 | Linnartz | |
| 2002/0137460 A1 | 9/2002 | Sun et al. | |
| 2003/0050058 A1 | 3/2003 | Walsh et al. | |
| 2003/0197607 A1 | 10/2003 | Striemer | |
| 2004/0029621 A1 | 2/2004 | Karaoguz et al. | |

FOREIGN PATENT DOCUMENTS

| | | |
|---|---|---|
| EP | 0992921 A2 | 4/2000 |
| EP | 1 025 738 | 8/2000 |
| EP | 1 357 704 | 10/2003 |
| EP | 0909112 B1 | 1/2004 |
| WO | 99/18506 A1 | 4/1999 |
| WO | 00/23899 A1 | 4/2000 |
| WO | 00/49731 A1 | 8/2000 |
| WO | 0110124 A1 | 2/2001 |
| WO | 01/47192 A1 | 6/2001 |
| WO | WO 01/45064 | 6/2001 |

OTHER PUBLICATIONS

G. Degoulet et al., EPEOS—Automatic Program Recording System, Nov. 1975, 22 pgs.

Tivo, Inc., Form S-1, Jul. 22, 1999, 902 pgs.

Chunlong Guo et al., "Low Power Distributed MAC for Ad Hoc Sensor Radio Networks," Berkeley Wireless Research Center, Dept. of EECS, University of California at Berkeley, 2001, pp. 2944-2948.

International Preliminary Report on Patentability for PCT/US04/08243 completed May 23, 2007.

International Search Report and Written Opinion for PCT/US04/08243 mailed Dec. 16, 2005.

International Search Report and Written Opinion for PCT/US06/06079 mailed Dec. 21, 2007.

EPO Communication for Application No. 04 757 592.3 dated Mar. 1, 2007.

EPO Communication for Application No. 04 757 592.3 dated Mar. 26, 2009.

EPO Communication for Application No. 04 757 592.3 dated Oct. 16, 2007.

Haartsen, J.C.; Mattisson, S.; Proceedings of the IEEE vol. 88, Issue 10, Oct. 2000, pp. 1651-1661.

International Preliminary Report on patentability for PCT/US2006/006079, issued Mar. 10, 2009.

Supplementary European Search Report of Application No. 04 757 592.3 dated May 4, 2006.

Afonso, A.P. et al., "Dynamic Data Delivery to Mobile Users," Department of Information, Science Faculty of the University of Lisboa, 1999, pp. 121-126.

Haartsen, J.C. et al., "Bluetooth-A New Low-Power Radio Interface Providing Short-Range Connectivity," IEEE Proceedings of the IEEE, vol. 88(10): 1651-1661.

Office Action for CN 200480007433.4, issued Jul. 17, 2009 (with English translation).

Office Action for U.S. Appl. No. 10/802,518, mailed Jul. 9, 2009.

Office Action on U.S. Appl. No. 10/802,518, mailed Dec. 15, 2009.

* cited by examiner

| Event 1 | Time offset 1 | Sync Event |
|---------|---------------|------------|
| Event 2 | Time offset 2 | Radio Record Event |
| Event 3 | Time offset 3 | Sync Event |
| Event 4 | Time offset 4 | Media Record Event |
| Event N | Time offset N | Action N |

FIG. 4a

SYSTEM AND METHOD FOR AUTOMATICALLY SYNCHRONIZING AND ACQUIRING CONTENT FOR BATTERY POWERED DEVICES

RELATED APPLICATION DATA

This application claims the benefit of U.S. Provisional Application Ser. No. 60/548,411, filed Feb. 28, 2004, which application is hereby incorporated by reference in its entirety.

BACKGROUND

The following relates generally to wireless synchronization and media acquisition methods for battery-powered multimedia based devices, which may be portable, fixed, or mounted in an automobile, recreational vehicle, boat, aircraft, or other vehicle.

Various systems and methods for synchronizing device settings and media between mobile or portable storage and playback devices are known. What is needed, however, is an improved system and method for automating, insuring data integrity, and optimizing battery power for devices that acquire content wirelessly or from local resources.

SUMMARY OF THE INVENTION

In accordance with this and other needs, the following generally discloses a system and method for synchronizing and acquiring content for battery-powered devices. A method of providing a power budget is described wherein various synchronization and content acquisition tasks able to be performed by a battery-powered device are governed by reference to the power budget available to the device. A system for notifying a synchronization server of the presence of the battery-powered device is also described for enabling synchronization activities between the server and battery-powered device.

A better appreciation of the objects, advantages, features, properties, and relationships of the disclosed synchronization and content acquisition methods and system will be obtained from the following detailed description and accompanying drawings which set forth illustrative embodiments which are indicative of the various ways in which the principles described hereinafter may be employed.

BRIEF DESCRIPTION OF THE DRAWINGS

For use in better understanding the exemplary system and method for acquiring data described hereinafter reference may be had to the following drawings in which:

FIG. 4a illustrates an exemplary scheduling event table for use in connection with content acquisition;

DETAILED DESCRIPTION

The present invention can find utility in a variety of implementations without departing from the scope and spirit of the invention, as will be apparent from an understanding of the principles that underlie the invention. Reference is made throughout this description of the invention to a portable battery-powered device such as a PDA, however it is understood that the particular synchronization and content acquisition system and method described herein may be applied for portable, fixed, and mobile battery-powered devices of any kind, including but not limited to laptop computers, audio players, video players, set top boxes (STBs), remote controls, automobile radio and computing systems, portable phone, watches, webpads, and the like. It will be understood that while the present invention is primarily described in relation to battery-powered devices, the inventive concepts may be applied to electronic devices requiring synchronization and content acquisition functions generally, including line powered device which require no batteries. It is also to be understood that battery-powered devices may have a self contained battery or draw power from a battery located externally to the device itself. Accordingly, for ease of description all such devices whether portable, fixed, mobile, and battery-powered or line-powered are collectively referred to herein as portable devices.

Figure 2:
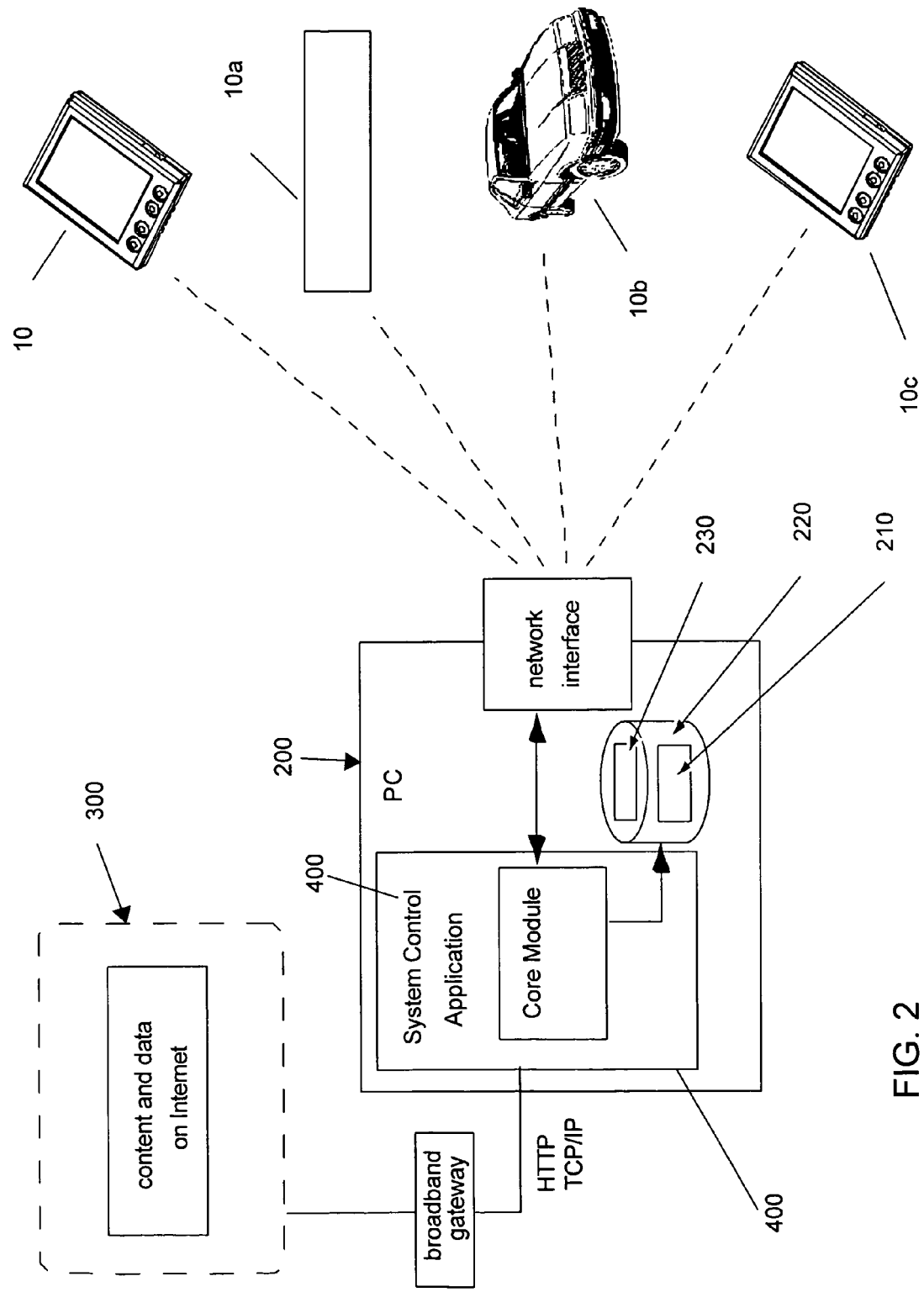
FIG. 2 illustrates a block diagram of an exemplary system including a server and multiple portable and mobile devices.

Looking now generally to FIG. 2, a portable device 10 periodically receives and stores data such as media files, device settings, and a content database from a server device 200. Additional devices such as stationary device 10a (which may be for example a network enabled set top box (STB), media streaming device, or the like), mobile device 10b (which may be for example a network enabled automobile media device), and secondary portable device 10c (which may be for example a remote control, webpad, or the like) are shown to illustrate the wide variety of devices that may be used in conjunction with the present invention. In addition, the mobile device 10 may record content from a local media source (e.g., radio receiver, audio compact disc, or video source). The content acquisition process is automated by scheduling a set of content acquisition times and performing the completion of scheduled tasks under consideration of a limited power budget. Alternatively, a user may manually start the content acquisition, after which the system may automatically complete the task under consideration of a limited power budget. When the device is not operational in a playback mode, the main computer subsystem in the portable device 10 is normally powered down or is in a low power state. A low power subsystem with a real time clock function is always operational. The low power subsystem includes user specified content acquisition and overall content acquisition budget time values in memory. When the real time clock value is equal to or exceeds a user specified synchronization or recording time value in memory, the microcontroller enables power to the main computer hardware subsystem. The main computer hardware executes software instructions for file transfers via a wireless network from a server computer or from a local media source, if new content is available. Alternatively, the synchronization or recording process may be started manually. The new content is downloaded according to filter selections and prioritization rules. Those rules, the available power budget, and the wake-up and sleep times, may be either transferred as part of the device settings or be stored as local device parameters. The length of time of the download is governed by a power budget algorithm for optimizing battery life. The synchronization and recording process includes error checking. After all file and settings transfers are complete, the main computer subsystem is powered down until the next positive match between the user specified synchronization time and the real time clock.

Figure 1:
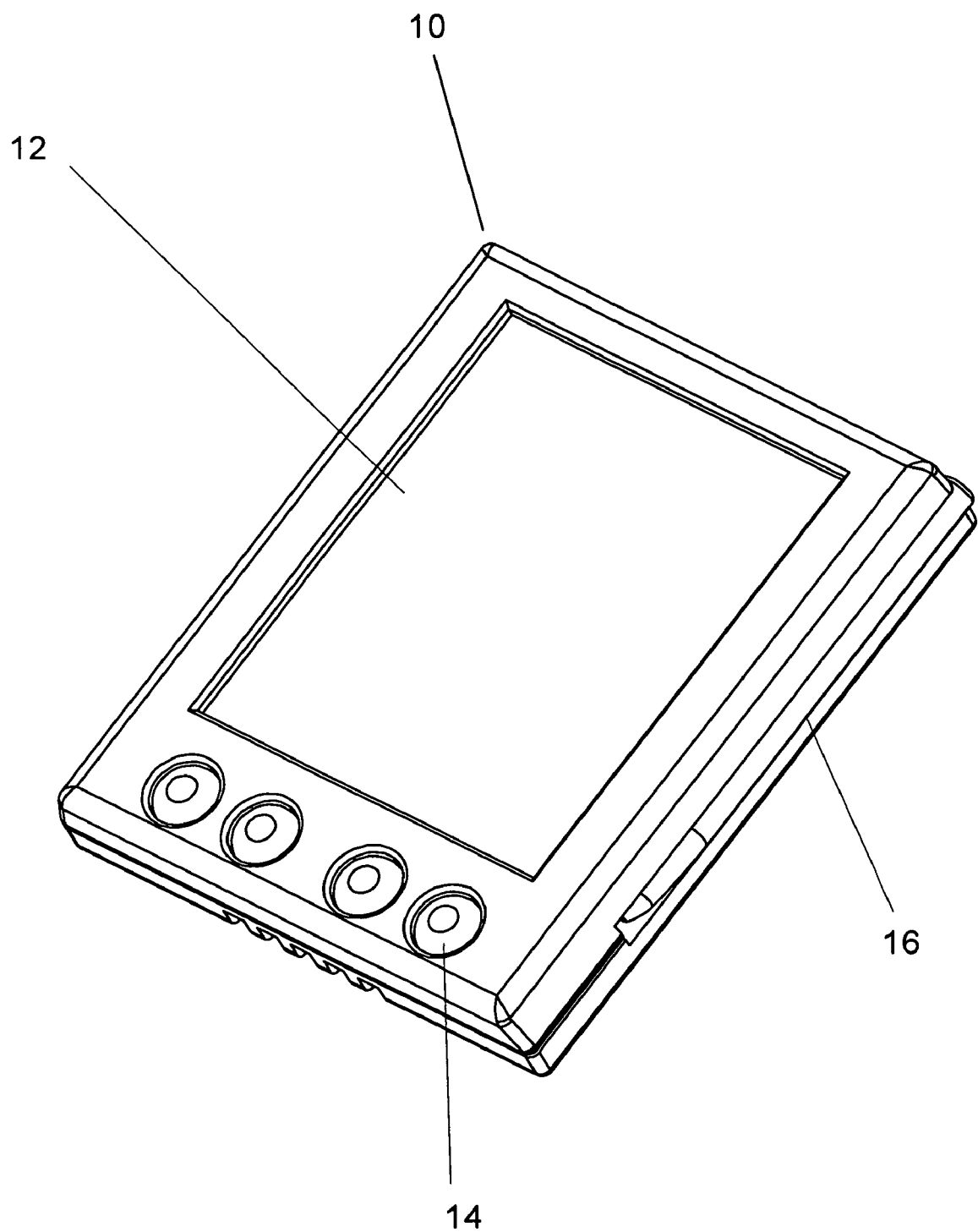
FIG. 1 illustrates an exemplary battery-powered portable device.

Turning now to FIG. 1, FIG. 1 shows an example of a portable device 10 for media storage and playback that includes a touch sensitive LCD 12, and a stylus 16, and function buttons 14 for interacting with a user interface that controls an operating system and software applications. FIG. 2 shows a server 200 that connects to a variety of devices 10, 10a, 10b, and 10c via a wireless network including portable devices 10 and 10c, a mobile device 10b, and a stationary device 10a as described above. Alternatively, a wired network (i.e., Ethernet based network), may be used to connect devices 10a to server 200, which devices may be stationary or portable but having the ability to accept a wired network connection. It will be understood and appreciated that the system disclosed herein may support a plurality of like devices. For example, the system may support a plurality of portable media storage and playback devices and a plurality of automobile-installed (mobile) media storage and playback devices as well as fixed or stationary devices.

Figure 3:
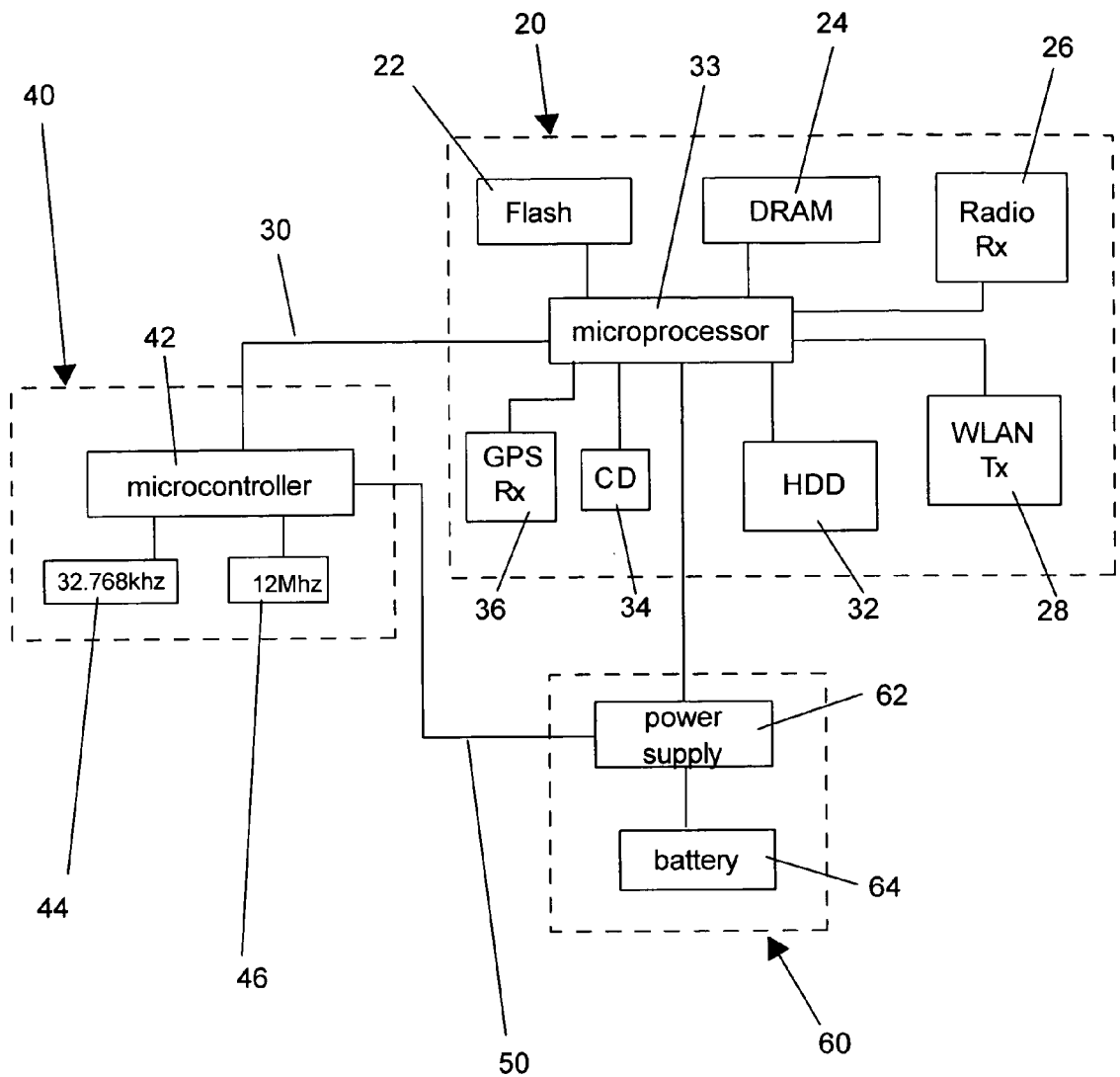
FIG. 3 illustrates a block diagram of exemplary electronic hardware for use in connection with the battery-powered portable device.

FIG. 3 shows a hardware block diagram of portable device 10 that generally includes a main computer subsystem 20, a low power computer subsystem 40, and a power supply subsystem 60 that includes a voltage regulator and a battery. As needed for a particular application, the main computer subsystem 20 may include a hard disk drive 32, a microprocessor 38, a DRAM system memory 24, a flash memory 22, a CD/DVD-drive 34, a radio receiver 36, and a wireless local area network (LAN) transceiver 28. The microprocessor 38 typically includes a UART. In alternative embodiments, the portable device 10 may include flash memory 22 as all or part of the mass storage medium. Wireless LAN transceiver 28 may be an 802.11b compliant transceiver, although in other embodiments WLAN or PAN (so-called Personal Area Network) transceivers operating according to alternative transmission formats by be used, such as 802.11g, 802.11a, Bluetooth, etc. The radio receiver 36 may be a AM/FM, HD-Radio (iBOC), DRM (digital radio mondiale), or DAB receiver that can be controlled by the microprocessor. In alternate embodiments which include video and/or radio capabilities, radio receiver 36 may include or be used in conjunction with a television tuner/receiver to provide video content to portable device 10.

By way of example only, microprocessor 38 may be a EP7312 ARM microprocessor manufactured by Cirrus Logic of Austin, Tex. The low power computer subsystem 40 may include a microcontroller 42 with a 37.768 khz low frequency real time clock crystal 44 and a 12 Mhz main CPU crystal 46. Microcontroller 42 may be a PIC16LF872 manufactured by Microchip of Chandler, Ariz. The microcontroller 42 may include a microprocessor CPU with a UART, system memory, a programmable input/output port, and non-volatile memory for example EEPROM or Flash, all integrated into a single IC chip. The low power computer subsystem 40 may include a time keeping function that enables it to run in a low power mode while keeping track of the elapsed time. The real-time clock may handle full date/time calculations and refer to absolute times. A communication link 30 may functionally connect microcontroller UART to microprocessor UART for transfer of control signals and data between microprocessor 38 and microcontroller 42 using the RS-485 protocol. A programmable input/output port on microcontroller is functionally connected to power supply subsystem via a power enable link 50.

As will be appreciated by those of ordinary skill in the art, ther hardware and/or communication methods such as SPI, parallel I/O, shared memory, etc. may alternatively be used when better suited to a particular application. By way of further example, although a 32.768 KHz watch crystal is illustrated as the timing source for microcontroller (since such components are inexpensive and widely available due to their ubiquitous use in clock applications) it will be appreciated that alternative timing sources may be used. Non-volatile memory such as EEPROM may be provided externally to either or both microcontroller and microprocessor. Further, certain microcoprocessor architectures may include built-in low power timer operational modes with or without dual-crystal (low speed/high speed) capability, in which case the functionality illustrated above may be physically integrated into a single processor chip, dispensing with the need for a separate microprocessor to perform timing and wake up functions. Still further, the main computer subsystem may include microprocessor and/or a DSP function capable of decoding a variety of content file formats such as audio files (MP3, WMA, .wav), digital image files (JPEG, TIFF, etc.), and video files (MPEG-2, MPEG-4, WMV, etc.). Within the device illustrated in FIG. 3, full power mode is defined as when low power subsystem 40 and main computer subsystem 20 are powered and fully functional, and WLAN transceiver 28 is functioning so that portable device 10 is receiving media from server 200 and writing the media to hard disk drive 32. Low power mode is defined as when low power subsystem 40 is operating and main computer subsystem 20 is powered down. By way of example, in full power mode an exemplary portable device draws over 800 milliamps of current, at an average of 3V. In low power mode, the same exemplary portable device draws approximately 3 milliamps.

Figure 4:
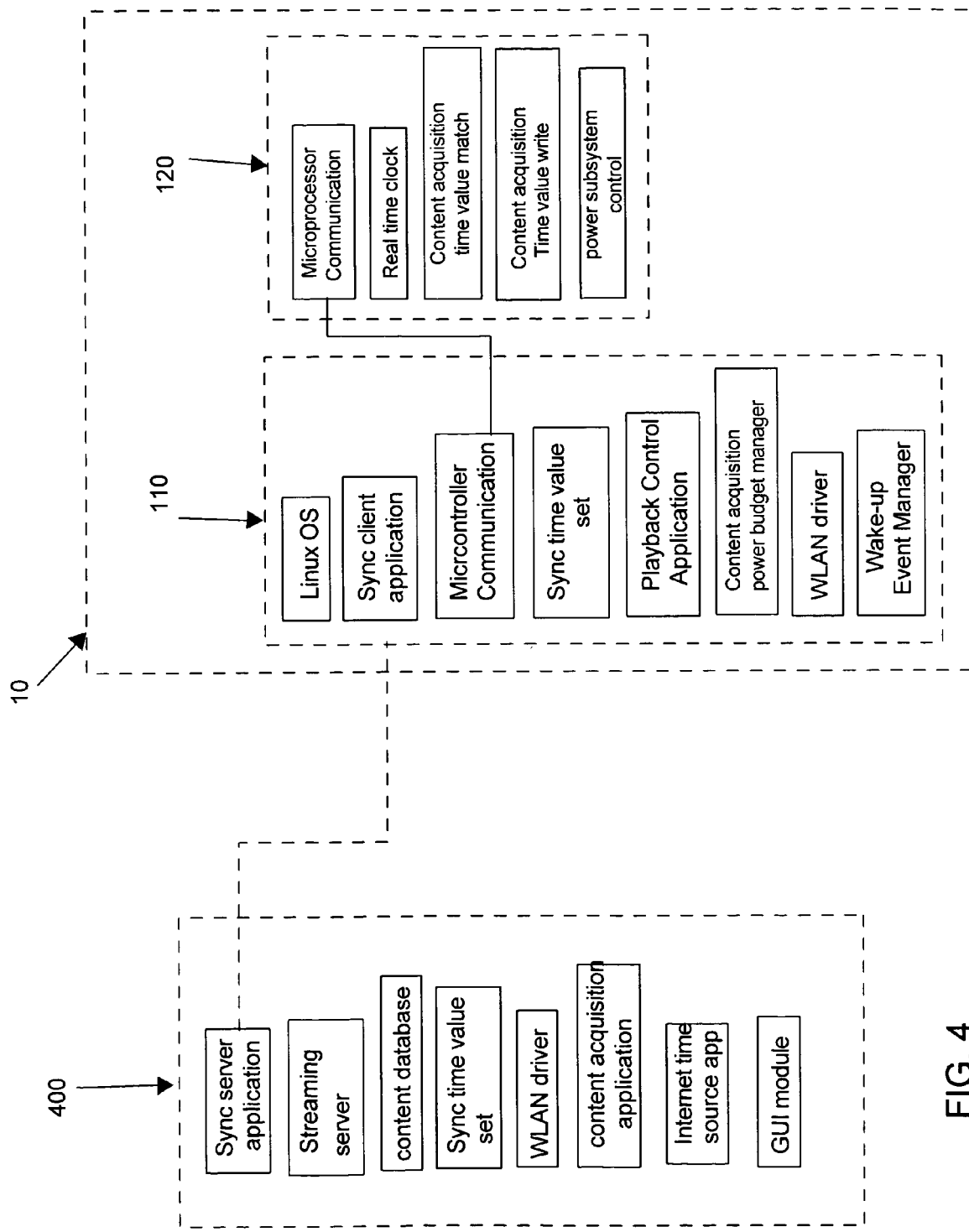
FIG. 4 illustrates exemplary software applications or functions executable at the server and portable device.

Considering now FIG. 2 and FIG. 4, in the exemplary embodiment server 200 is a general purpose PC but may also be a set top box, home gateway device, Internet appliance or any other device which includes an ability to access and store content from the Internet or to have content input by a user, such as via ripping of CDs, DVDs, recording content, etc. To this end, the server may include a system control application 400 with a number of functional services as appropriate. In the example illustrated generally in FIG. 4, the streaming service provides discovery, control logic, and streams via the http protocol to devices capable of decoding associated digital media files, such as MP3 files. The sync service application includes device discovery, synchronization control, including the content prioritization functions described below, and logic for transfer of digital media files and other files via ftp over a wireless network to devices with mass storage. In some embodiments, the media files can be transferred using HTTP-Get, Media Transfer Protocol (MTP), or other transport mechanisms. Other transport mechanisms may include the use of a "shuttle" device, such as a portable hard drive, a secure digital card or other portable storage media. If such a transfer device is used exclusively, it will be appreciated that the embedded system within the portable or mobile device may preferably have available to it an absolute time base generated for example through a GPS receiver, a wireless time receiver, or some other equivalent absolute timing mechanisms. The content acquisition times and other device settings may be transferred to the embedded portable or mobile device using a two step synchronization process. In the first step, the "shuttle" storage media is synchronized with the PC via USB or any other communication link. In a second step, the content of the "shuttle" device is synchronized with the embedded system using a USB or other communication interface.

In an exemplary embodiment a content database utilized in connection with the described processes may be a relational database that relates a variety of parameters (database columns) pertaining to digital media files stored on server hard disk drive 32, or addresses to streams or downloadable files on Internet servers 300. By way of illustration, the following is an exemplary SQL statement that creates a table that is the content database:

| CREATE CACHED TABLE AVOBJECT( ) | |
| --- | --- |
| id | INTEGER PRIMARY KEY, |
| parentId | VARCHAR(36), |
| restricted | INTEGER NOT NULL, |
| refObjectId | VARCHAR(36), |
| childcount | INTEGER, |
| clazz | VARCHAR(255), |
| creator | VARCHAR(255), |
| avindex | INTEGER NOT NULL, |
| deleteWhenEmpty | INTEGER, |
| defaultSort | VARCHAR(255), |
| cacheable | INTEGER, |
| streamer | VARCHAR(255), |
| newsCenterCategory | VARCHAR(255), |
| stationId | VARCHAR(255), |
| description | VARCHAR(255), |
| updateId | INTEGER, |
| title | VARCHAR(255), |
| artist | VARCHAR(255), |
| album | VARCHAR(255), |
| albumArtUri | VARCHAR(255), |
| genre | VARCHAR(255), |
| composer | VARCHAR(255), |
| avdate | VARCHAR(255), |
| originalTrackNumber | INTEGER, |
| subject | VARCHAR(255), |
| location | VARCHAR(255), |
| director | VARCHAR(255), |
| producer | VARCHAR(255), |
| mpaaRating | VARCHAR(255), |
| uri | VARCHAR(100), |
| protocolInfo | VARCHAR(255), |
| userRating | VARCHAR |
| playCount | VARCHAR |
| playDate | DATE, |
| publishDate | DATE, |
| refreshTime | INTEGER, |
| syncDate | DATE, |

| -continued | |
| --- | --- |
| CREATE CACHED TABLE AVOBJECT( ) | |
| durationInMillis | BIGINT, |
| bitrate | INTEGER, |
| sampleFrequency | INTEGER, |
| bitsPerSample | INTEGER, |
| audioChannels | INTEGER, |
| avsize | BIGINT, |
| resolutionWidth | INTEGER, |
| resolutionHeight | INTEGER, |
| colorDepth | INTEGER, |
| protection | VARCHAR(255), |
| originalFilePath | VARCHAR(255); |

For populating the content database, digital audio files such as MP3 or WMA media files include descriptive data, referred to as metadata, embedded in the file header. For example in the case of a music file, text strings for the song title, artist, album, and music genre are embedded in the file. A content database function extracts metadata from files and builds database references that allow for user access to digital files by metadata parameters. Referring to the SQL listing above, the title, artist, album, genre, and avdate are column identifiers that correspond to metadata from digital audio files.

Content database parameters that reference digital media files can also be obtained from user input, or from external lists that provide reference data for certain media files based on title. For example, for a digital media database that includes digital image files (JPEG, TIFF, etc.), the user might input database parameters such as avdate, title, etc. using a text entry user interface.

Database reference parameters may also be derived from a file structure on a disk. Using the example of digital image files, if a storage path and file name is \\photos\family photos\September 2000, content database may reference the file in content database based on a "family" and "September 2000" parameters input into the title and avdate columns, if so directed by user using a graphical user interface.

Figure 6:
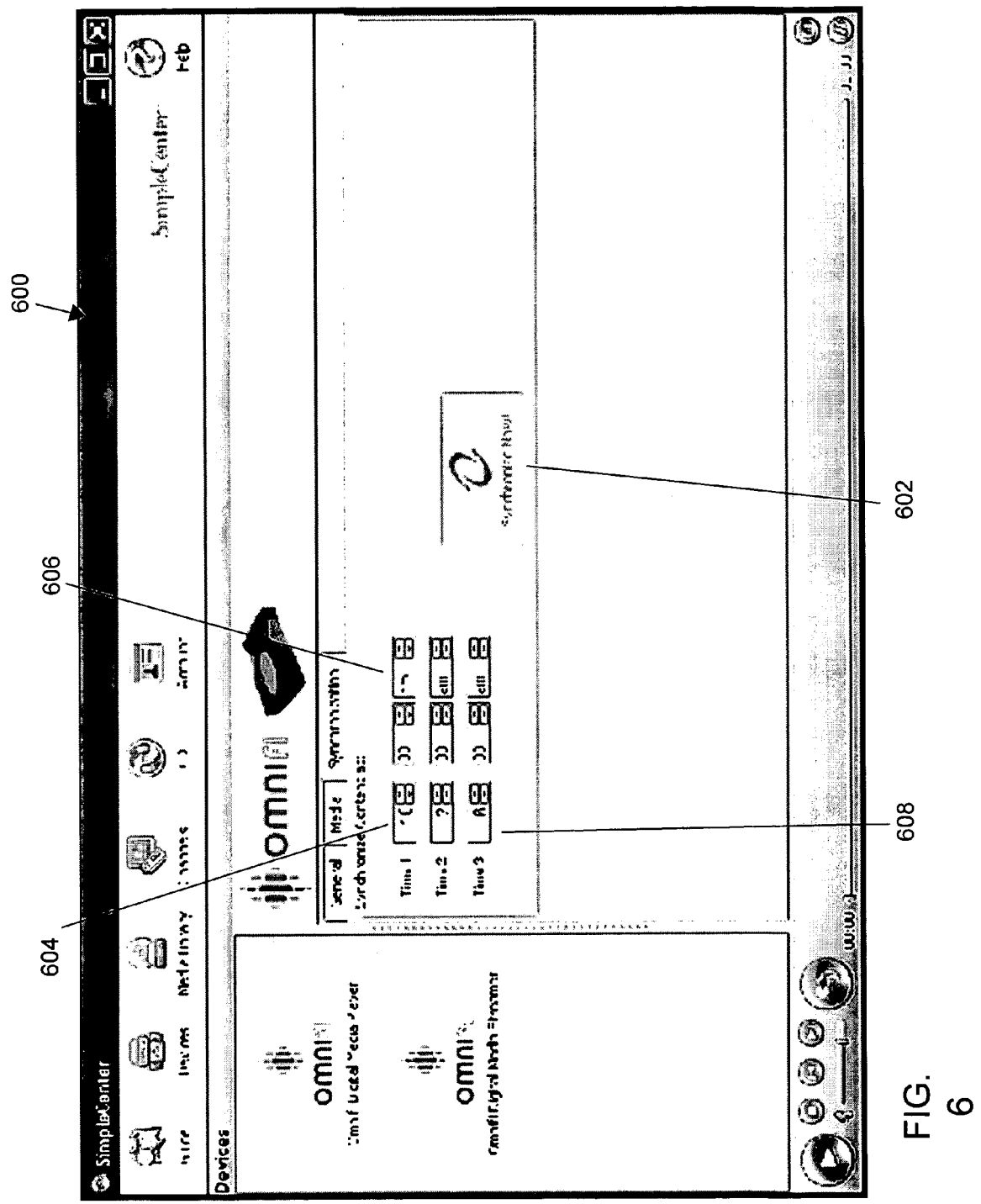
FIG. 6 illustrates an exemplary graphical user interface for scheduling content acquisition events.

Referring now to FIG. 6, an exemplary sync settings graphical user interface or GUI 600 is illustrated. The sync settings GUI 600 is a presentation layer of the sync time value set service shown in FIG. 4. The sync time set value service receives and stores time inputs from sync time value settings 604, 606, and 608 for future transfer to portable device 10 during synchronization. Manual sync button 602 is provided to enable user initiated sync operations.

The content acquisition application of system control application 400 automatically acquires content from Internet servers based on three potential parameters: user selections, availability of an item, and content refreshment policies specific to each content item or content service. In addition, the system control application 400 on the server 200 may gather recording start and end times for one or a plurality of audio and/or video programs from an Internet server that hosts an on-line Electronic Programming Guide (EPG), such as offered by RadioTime.com.

Figure 11:
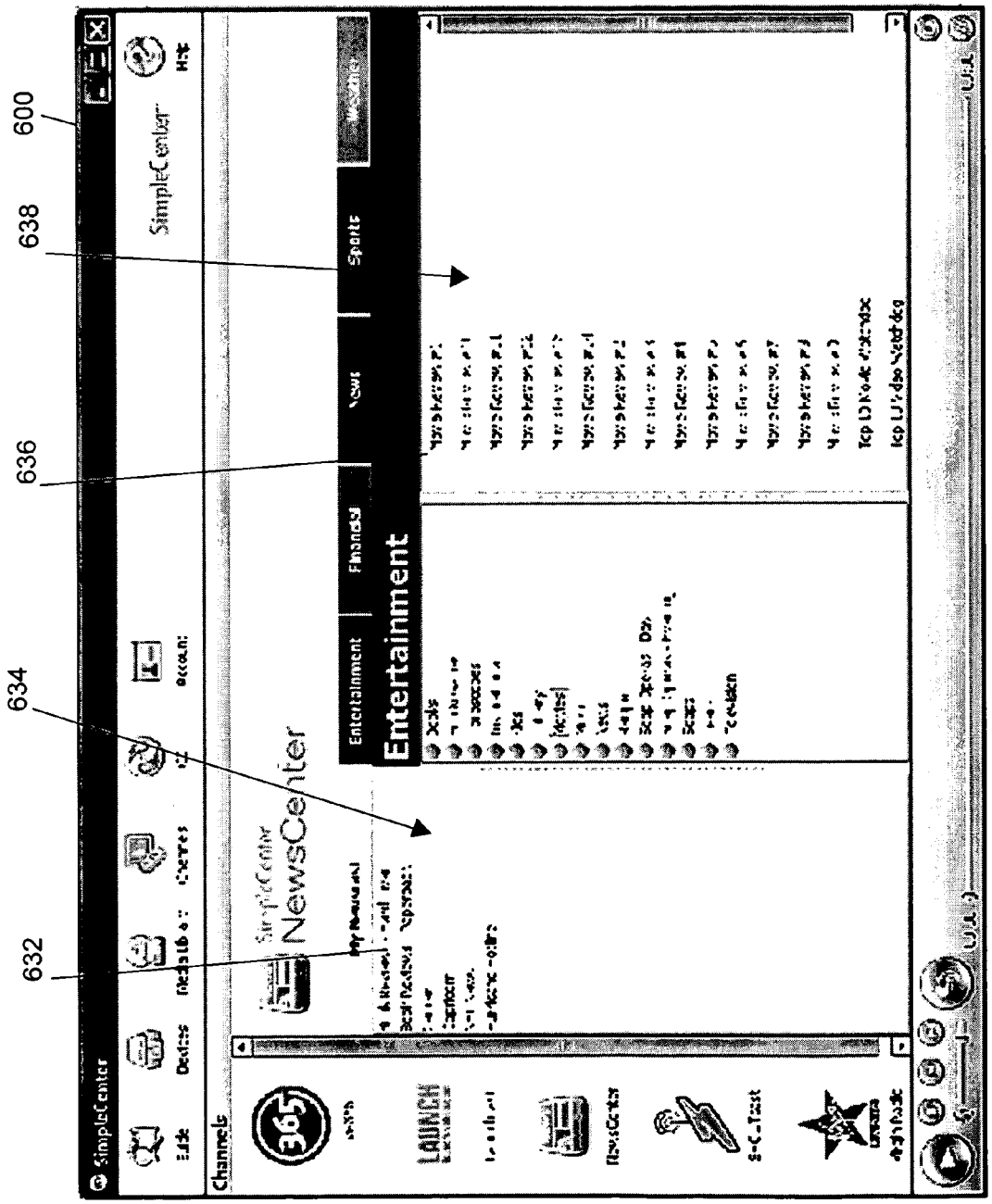
FIG. 11 illustrates an exemplary graphical user interface for selecting Internet content items.

Referring now to FIG. 11, an exemplary graphical user interface for content synchronization is shown. A user selects a content item 636 of interest from content items list 638 and drags content item 636 over to content selection list 634. Once in content selection list 634, each item becomes a user content selection 632 for synchronization as described in greater detail below. In this example, each content item 636 and user content selection 632 is a graphical representation of a pointer to an audio file on an Internet server that is periodically updated. The update period policy value, a 24-hour time value, is provided by the content provider. This policy value is stored in the content database in the refreshTime column and is associated with the content item. Other data related to the update function may be stored in the content database, including the time and date of the last download (publishDate), and time and date that the content item was last synchronized to a specific device (syncDate). For example, a news file on an Internet server may have an associated policy whereby the item is updated on an hourly basis.

The Internet time source application is a service that acquires the latest correct time from an Internet server. For example, the Internet-based time source such as the Network Time Protocol RFC-1305 (http://boulder.nist.gov/timefreq/service/its.htm) can be used as an accurate time source application for the time-server service.

Figure 14:
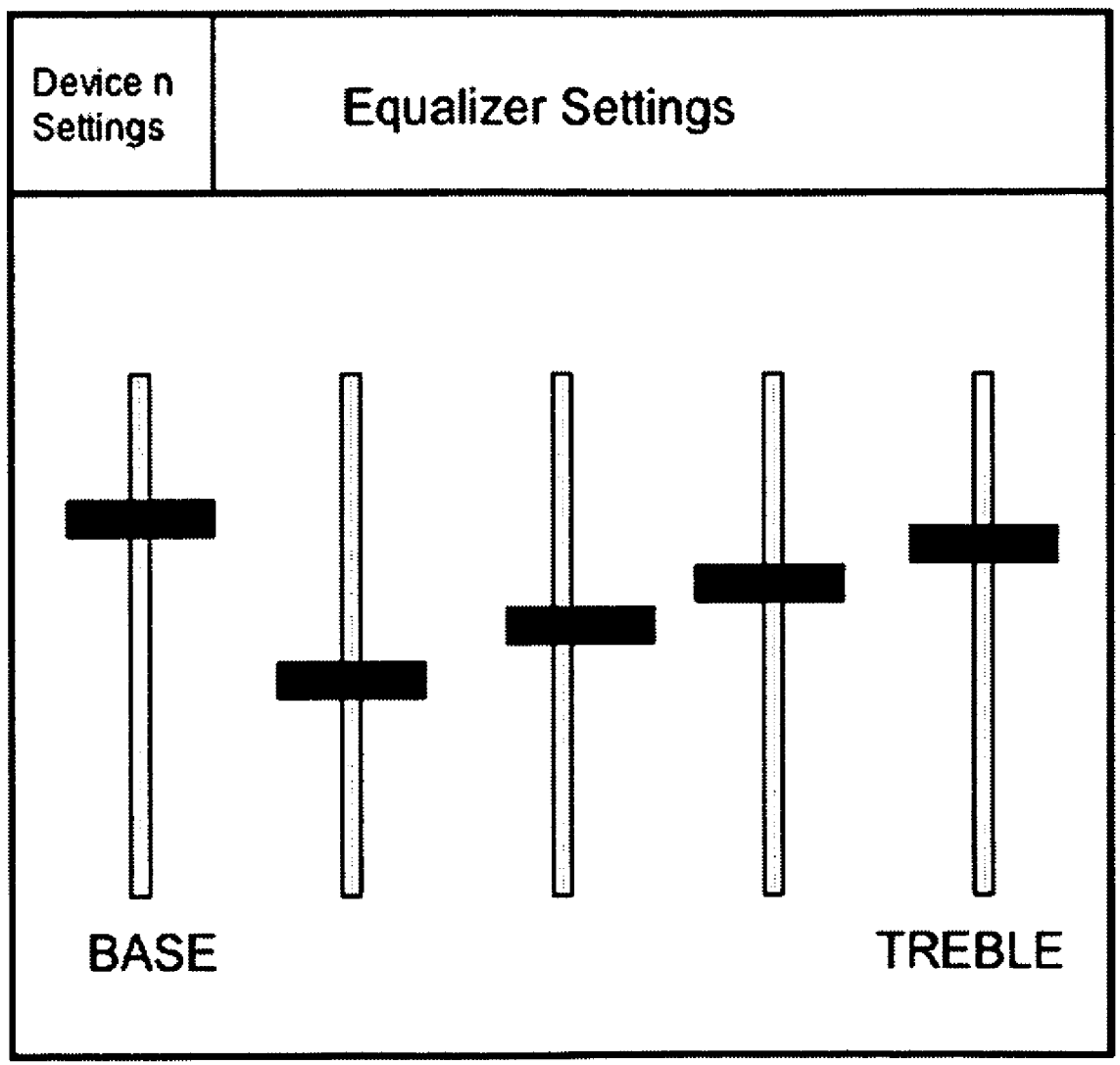
FIG. 14 illustrates an exemplary graphical user interface for selecting mobile device settings.
Figure 15:
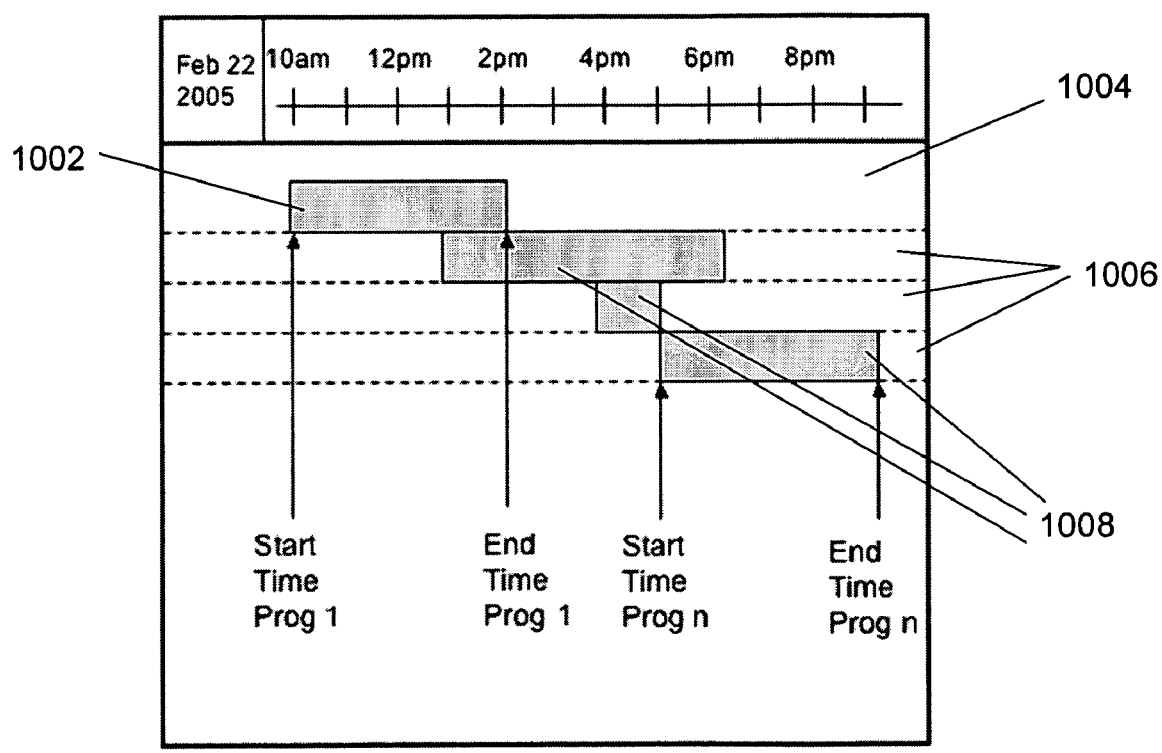
FIG. 15 illustrates an exemplary graphical user interface for selecting recording settings.

The graphical user interface (GUI) module 600 is the presentation layer application that is shown in FIG. 6, FIG. 10, FIG. 11, and FIG. 12. GUI module 600 functionally communicates with the plurality of functions contained in system control application 400 for the purpose of supplying user inputs. FIG. 14 shows for example how the user can edit additional device configuration settings (e.g., audio equalizer settings, video color, tint, and brightness setting, etc). In addition to managing wake-up times, the System Control GUI module 600 may manage additional mobile device specific settings such as background screen, presets for buttons and controls, preferences for radio stations and equalizer settings, and shortcuts for content navigation and playlist management. FIG. 15 shows a graphical user interface for selecting radio programs on an electronic program guide. The first program to be recorded 1002 on first broadcast channel 1004 is show as having user selectable start and end times on the timeline. Additional programs 1008 broadcast on different channels 1006 may be selected by the user for recording via the interface. The System Control application 400 facilitates the transfer of the radio channel information and recording times from the EPG to a device profile file that can be transferred to the mobile device 10 using the synchronization methods described herein.

Exemplary portable device 10 includes an operating system such as, for example Linux, Windows CE, Palm OS, Symbian, etc. stored in non-volatile memory and executed on microprocessor 38 when portable device 10 is powered on. In general, the mobile device 10 may run any operating system that allows multithreading, process control, networking and file access. In yet another embodiment, the mobile device 10 may include a module for receiving absolute time information, such as for example a GPS receiver or any other time receiver using a wireless connection.

FIG. 4 shows exemplary software/firmware 110 associated with portable device 10. First, software functions executing on microprocessor will be described. The sync client application manages discovery of and communication with server, file transfer (utilizing file transfer protocol) from server, and interfaces with microcontroller communication service. During synchronization, content files and device settings are transferred from server to portable device 10. The portable device 10 may store the content acquisition events in an event table. FIG. 4a illustrates an exemplary series of entries in a the content acquisition event table. For each entry, the event table stores type of event (synchronization or recording), the start time, and the stop time for the event. Microcontroller communication is the software service executing on microprocessor 38 that handles communication with the microcontroller 42, via an RS-485 communication link in the exemplary hardware implementation. The low power subsystem software/firmware 120 likewise includes microprocessor communication service for facilitating such communications between the main computer subsystem 20 and low power subsystem 40.

The sync time value set service is facilitate by the wireless sync GUI 150 illustrated in FIG. 5, as well as the underlying logic for acquiring and storing time inputs by a user into the system memory as described in greater detail below.

Playback control application is the set of software functions that enable user control of content files 210 stored on hard disk drive 220, and the associated and required CODECs. Playback control may include presentation layer elements as well as control logic. Such playback control applications are well understood by one skilled in the art of portable media player design and will accordingly not be discussed in further detail herein.

The content acquisition budget manager is a set of software functions that determine the length of time that portable device will execute content synchronization with the server and/or recording from other local sources such as the radio receiver and, as a result of performing these tasks, the amount of battery that the portable device will expend. The content acquisition budget operates based on one or more parameter and is described in greater detail below.

Next, software functions executing on microcontroller will be described. Microprocessor communication function is the software that handles communication between microprocessor and microcontroller over the exemplary RS-485 bus communication link. Clock function is the software that handles the elapsed time function described above. Sync time value match is the software that handles the comparison between the real time clock value and sync time values that have been stored in microcontroller non-volatile memory. Wake-up time value write is the software that handles the process of writing wake-up time values received from microprocessor in EPROM. Power subsystem control is the software control logic that enables and disables the power supply subsystem via the power enable link.

Figure 5:
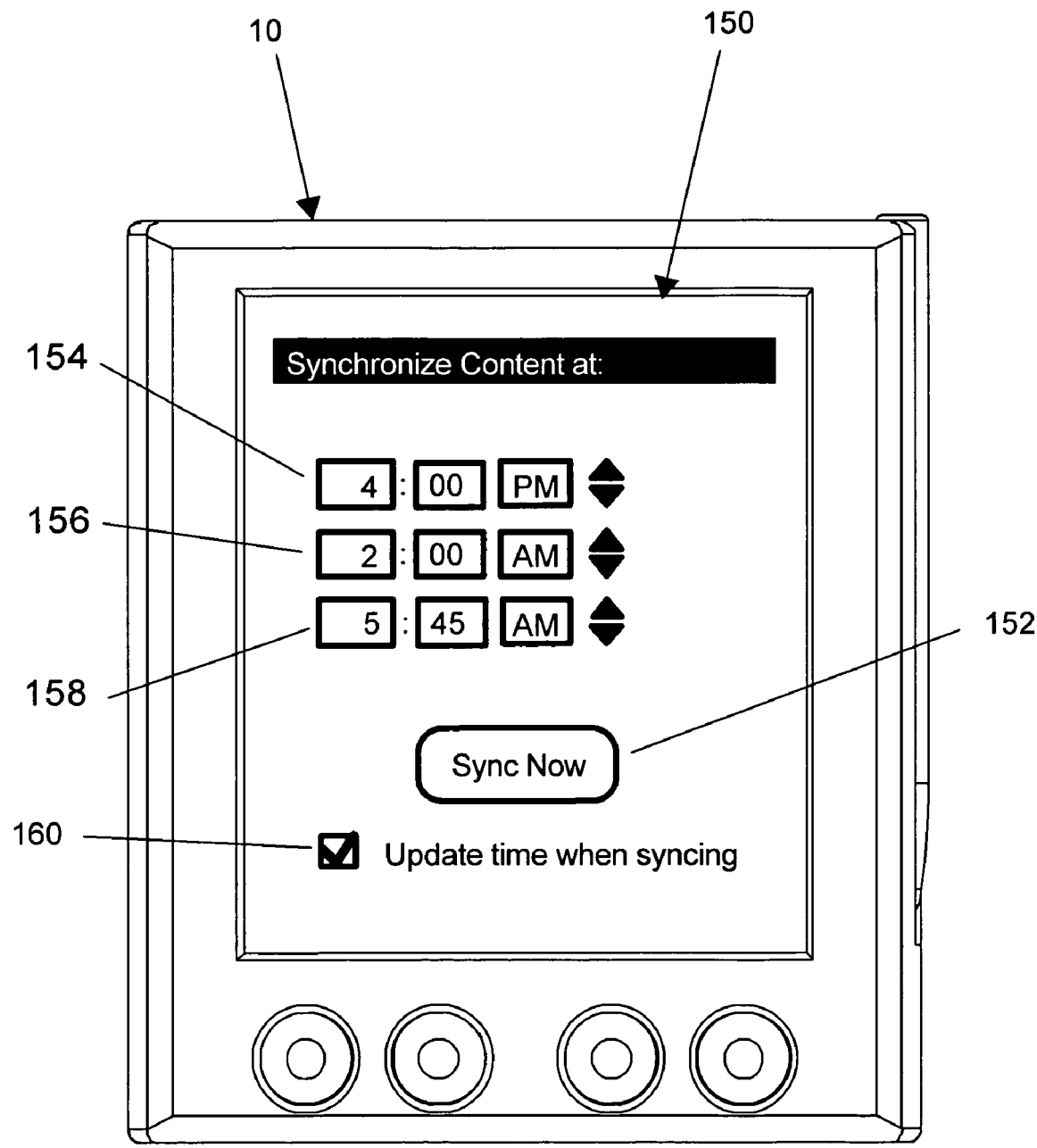
FIG. 5 illustrates an exemplary graphical user interface for setting sync times and other settings on the portable device.

In an exemplary embodiment, the portable device is powered on and a setup software application is activated by a user, such as the exemplary wireless sync GUI 150 illustrated in FIG. 5 for setting up wireless synchronization. The actual time may be input into portable device by the user, or may be acquired via a time service as described above. The clock on the device may be automatically updated during every synchronization, whether automatic or user activated, as a default mode of operation. The function can be disabled by the user using the sync time checkbox. Referring again to FIG. 5, a plurality of sync times may be input by the user using sync time settings 154, 156, and 158. Sync times 154, 156, and 158 are typically stored in non-volatile memory. The user can manually activate synchronization by activating the manual sync button 152 on portable device user interface 150. Sync time values 154, 156, and 158 are converted to sync time values and are transferred to microcontroller 42 via communication link, and written into microcontroller non-volatile memory. This process is described in further detail below.

In one exemplary embodiment, content acquisition times can also be set using a graphical user interface 600 on the server device (PC, set-topbox, etc.) as shown in FIG. 6 and as described above. For consistency of user experience, this may be similar to the graphical user interface 150 on portable device 10. The sync time values 604, 606, and 608 set using graphical user interface 600 on the server device are transferred to portable device during the next synchronization.

Figure 7:
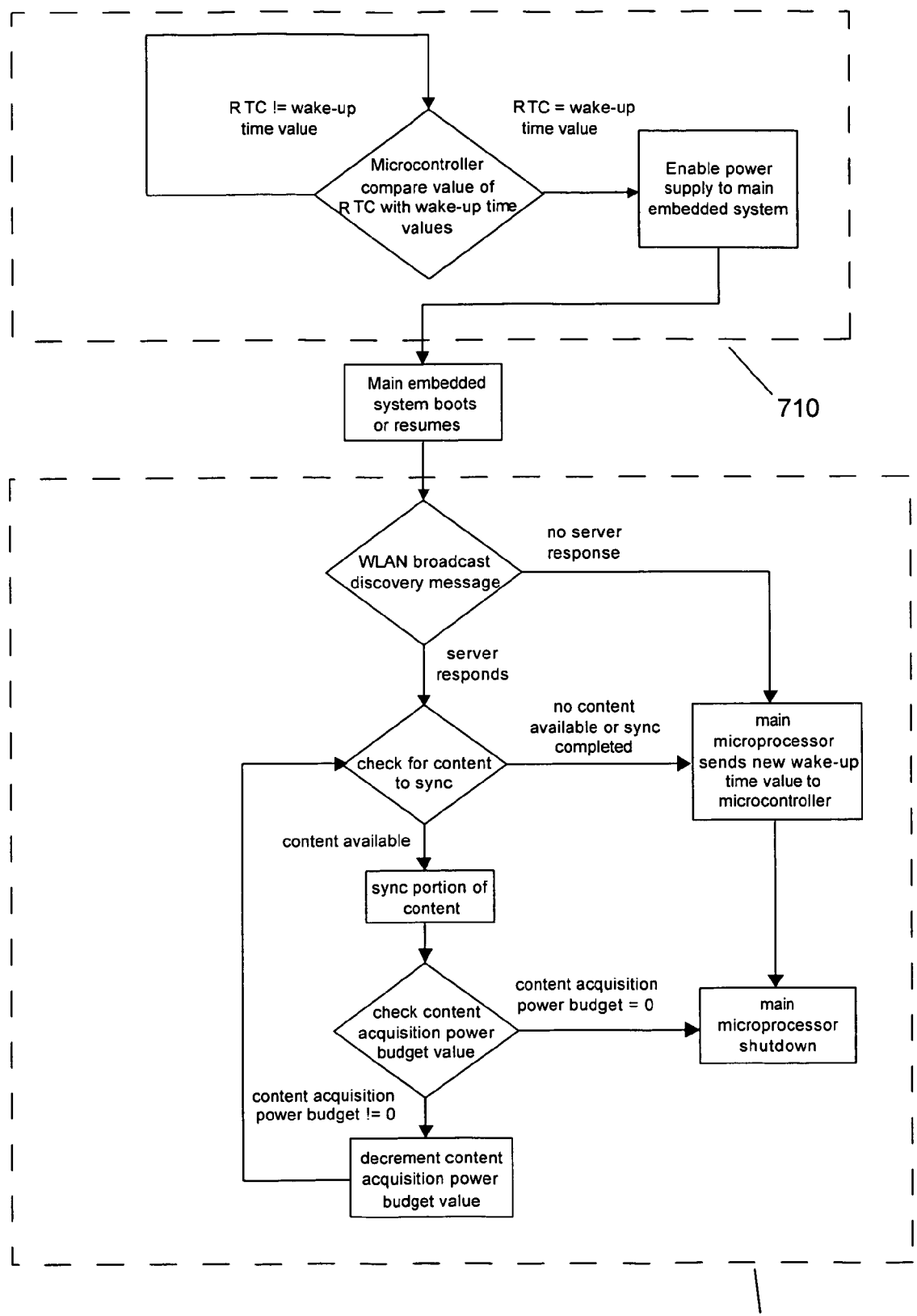
FIG. 7 illustrates an exemplary flowchart showing a process by which the low power computer subsystem enables the main computer subsystem.

Referring now to FIG. 7, a flowchart illustrates an exemplary method by which microcontroller 42 may function to enable main computer system to execute a content synchronization. In low power mode, operation of the main microcontroller 42 CPU is suspended and 12 Mhz crystal 46 is not powered, but low-frequency 32.768 khz crystal 44 and a small subsystem of microcontroller (not shown) including a 16-bit counter remain active. Every two seconds the 16-bit counter rolls over, generating an interrupt, which activates the 12 Mhz crystal 46 and the microcontroller 42 CPU. Upon being enabled, programming the CPU increments an internal 32-bit real time counter (RTC) by two seconds and compares this value with the wake-up event time value (sync times or record start/stop times) stored in a non-volatile memory register. If the values do not match, the main CPU immediately suspends operation once again. This process starts when low power computer subsystem is initially connected to power, and continues as long as low power computer subsystem is powered. A 32-bit counter number magnitude provides for a total second count of 4,294,967,295, which enables RTC to keep track of time for up to 136 years.

Referring to FIG. 7, in low power mode 710, when RTC is equal to a wake-up event time value, microcontroller enables the power supply to main computer subsystem, which commences operation of full power mode 720. The microcontroller firmware then sends a message to sync client application 400 on main computer system instructing sync client application to broadcast a discovery message in an attempt to discover a viable server. Once a valid server response is received, the main computer subsystem software performs the content synchronization and the content acquisition budget is decremented proportional to the amount of time that the wake-up event required. If the content acquisition budget value is zero or negative after decrementing, the main system powers down without updating the wake up time value stored in the microcontroller, thus the microcontroller will not wake up main system again until the content acquisition power budget is restored.

Figure 8:
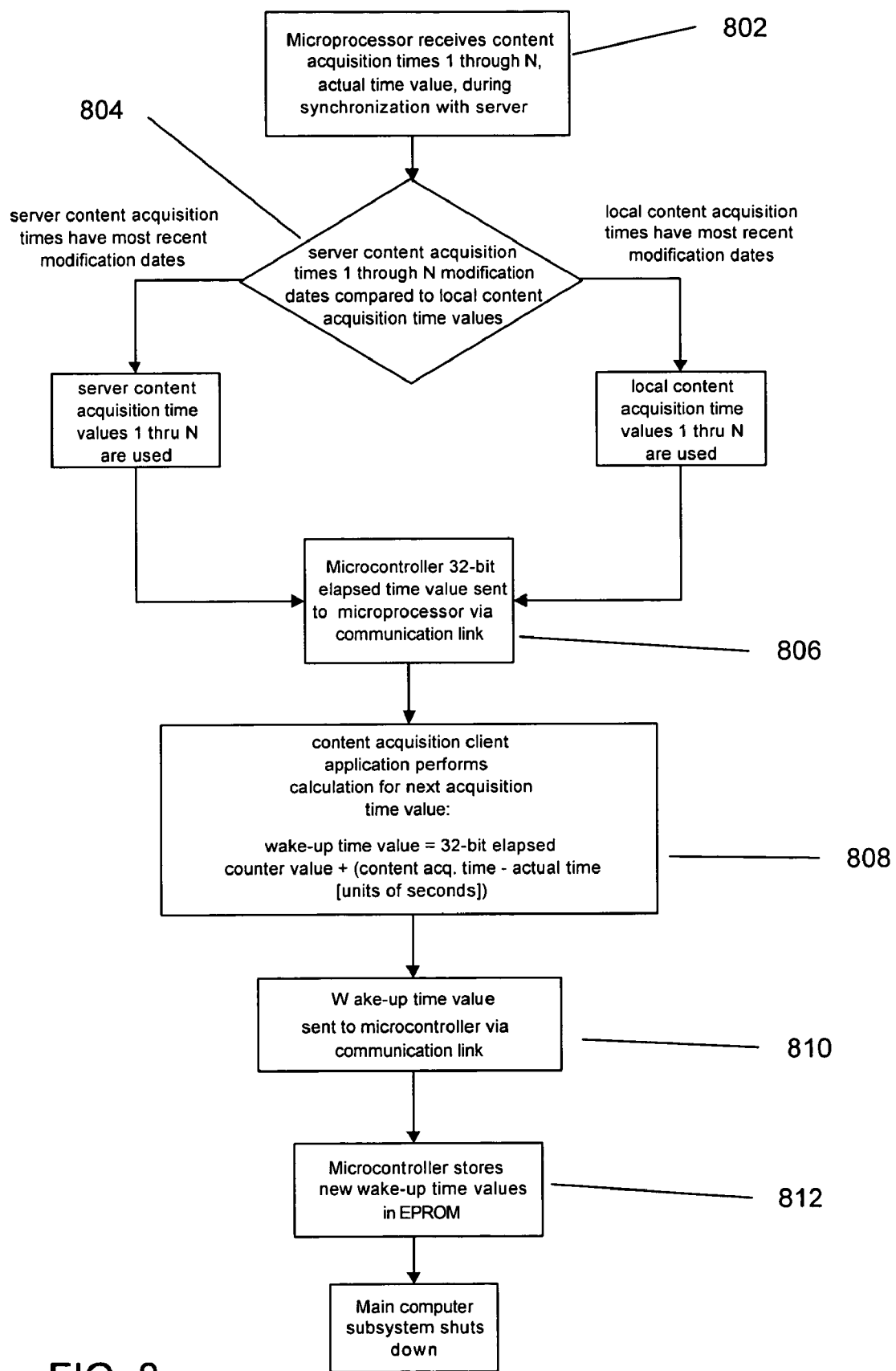
FIG. 8 illustrates an exemplary flowchart showing a process by which a synchronization client application calculates wake-up time values.

As long the content acquisition power budget is still available the content acquisition manager interacts with the microcontroller firmware to produce new content acquisition wake up timer values. In one exemplary embodiment the content acquisition manager stores content acquisition events in a scheduling table as described earlier. FIG. 4a shows such an exemplary content acquisition time table which includes event times for synchronization (sync time) and recording (record start and stop time). FIG. 8 illustrates an exemplary method for updating wake-up event values in microcontroller non-volatile memory. Referring now to event 802 in FIG. 8, microprocessor may receive user specified content acquisition times during synchronization, or when a user directly inputs times using a user interface on the portable device 10, an example of which is illustrated in FIG. 5. In this exemplary embodiment there are three user settable synchronization times. There may also be a preset fixed sync time, e.g. 2:00AM, which is defined and compiled within the sync client application and cannot be changed by the end user. Since in various embodiments there might be any practical number of user settable, or alternatively derived content acquisition times, the method illustrated in the flow chart of FIG. 8 states the number of sync times as 1 through N. In an exemplary embodiment, the user may select time periods, after which the synchronization process starts in a periodic matter. To permit coordination of user sync times between those entered at the server device and those entered directly on the mobile device, messages containing the user specified sync times also include modification dates and/or timestamps which indicate when the sync times were set. As shown at Event 804 this information may be evaluated to decide whether to use the locally set user sync times or the sync times received from the server. The user specified synchronization (content acquisition) times with the most recent modification dates are used.

As shown at Event 806 in this exemplary method the current 32-bit elapsed time counter value is retrieved from microcontroller into microprocessor via a communication link. The 32-bit wake-up event time values are then calculated as 32-bit numerical offsets of the 32-bit elapsed counter value, as illustrated at Event 806. As illustrated in Event 810 and Event 812, calculated content acquisition event time values 1 through N are then transferred from microprocessor 38 to microcontroller 41 via communication link 30, to be stored in microcontroller non-volatile memory. After this the main computer subsystem 20 shuts down and the process continues as previously described in conjunction with FIG. 7.

Figure 9:
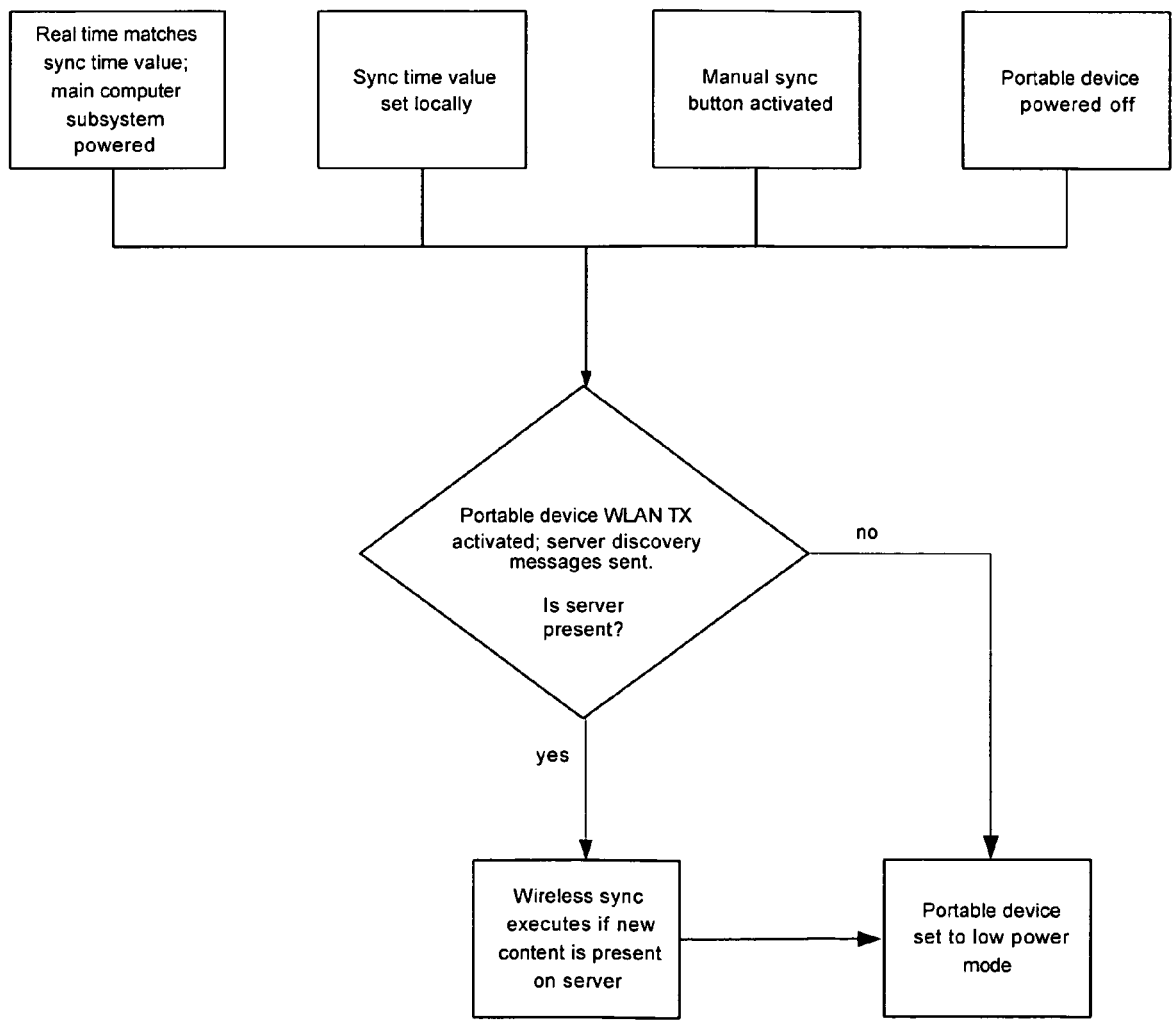
FIG. 9 illustrates an exemplary flowchart showing the modes by which a wireless synchronization is executed.

The flowchart of FIG. 9 illustrates an exemplary wireless synchronization activation based on four possible modes for portable device 10. These modes are: (1) RTC value matches a sync time value for one type of content acquisition event in microcontroller non-volatile memory as described in the foregoing sections; (2) the user manually sets a time sync value using portable device graphical user interface; (3) the user manually activates synchronization using the manual sync button, and; (4) preceding the transition of portable device to low power mode. Entering low power mode can be based on an internal timer function (for example many portable devices include an automatic power off after a specified number of minutes) or when the user powers off the device.

In the above embodiment, calendar specifics such as daylight savings time and leap years are preferably dealt with by main computer system which has more power and more memory.

In yet another embodiment, the main computer system receives the current time from an absolute time resource such as a GPS receiver or any other absolute time receiver. In this scenario, content and device settings can be transferred using a shuttle device such as a SD-card, a compact flash card, a portable harddrive, or any other portable storage device. The system control application 400 on the server 200 or other computing device writes the content acquisition times onto that portable memory device. If the portable storage device is inserted into the main computer subsystem, the content acquisition times are transferred to the main computer system's non-volatile memory. Next, the Content acquisition manager obtains the current time from said absolute time receiver and then sets the wake-up time for the low-power subsystem according to the procedure described above.

In another embodiment, portable device 10 includes a microprocessor that is designed to conserve battery power by operating at a slow clock speed in addition to a standard operating clock speed, and/or by shutting down various subsystems, such as USB or other input/output subsystems. A low-frequency 32.768 khz crystal is connected to a microprocessor port. In low power mode, only that port and the required 16-bit counter and other internal registers required to implement the RTC function are powered. No microcontroller is used in this embodiment.

Figure 13:
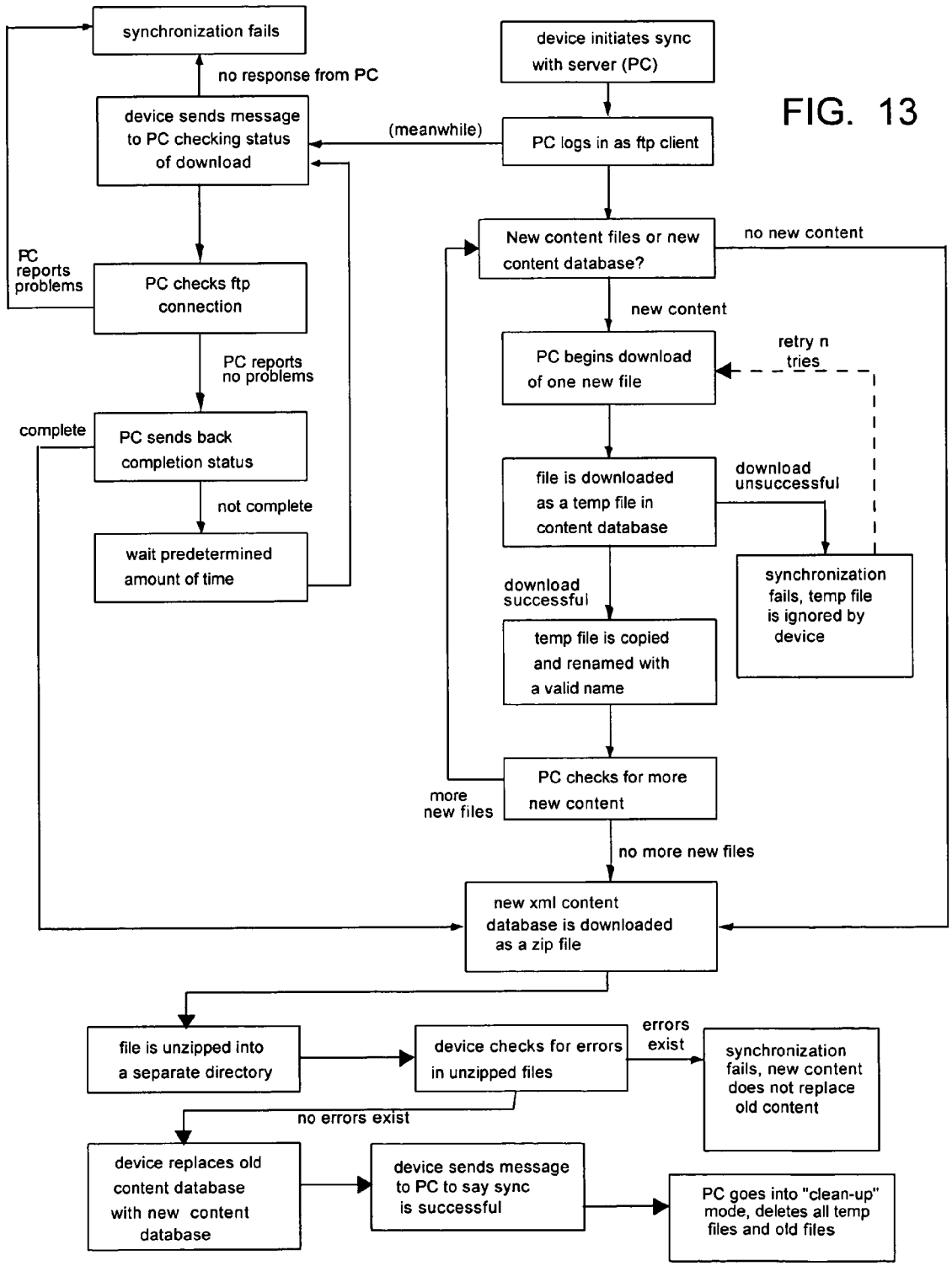
FIG. 13 illustrates an exemplary flowchart showing a synchronization process.

The flowchart of FIG. 13 illustrates one exemplary method by which server and portable device interact during a synchronization process. After portable device 10 has discovered server 200, the server logs in as a ftp client. If new content files exist and/or if the content database has been modified (for example the user has made a new playlist), the device configuration settings, the content and/or database are downloaded. New content files are downloaded one at a time as temporarily named content files. After downloaded content files are verified downloaded without errors (by checking content file size from the original on server), content files are renamed to their original names.

After all content files 210 are downloaded from server 200 to portable device 10, a new content database 230 is compressed and downloaded to portable device 10. Portable device uncompresses new content database. If no errors are found then the synchronization process is completed.

Figure 10:
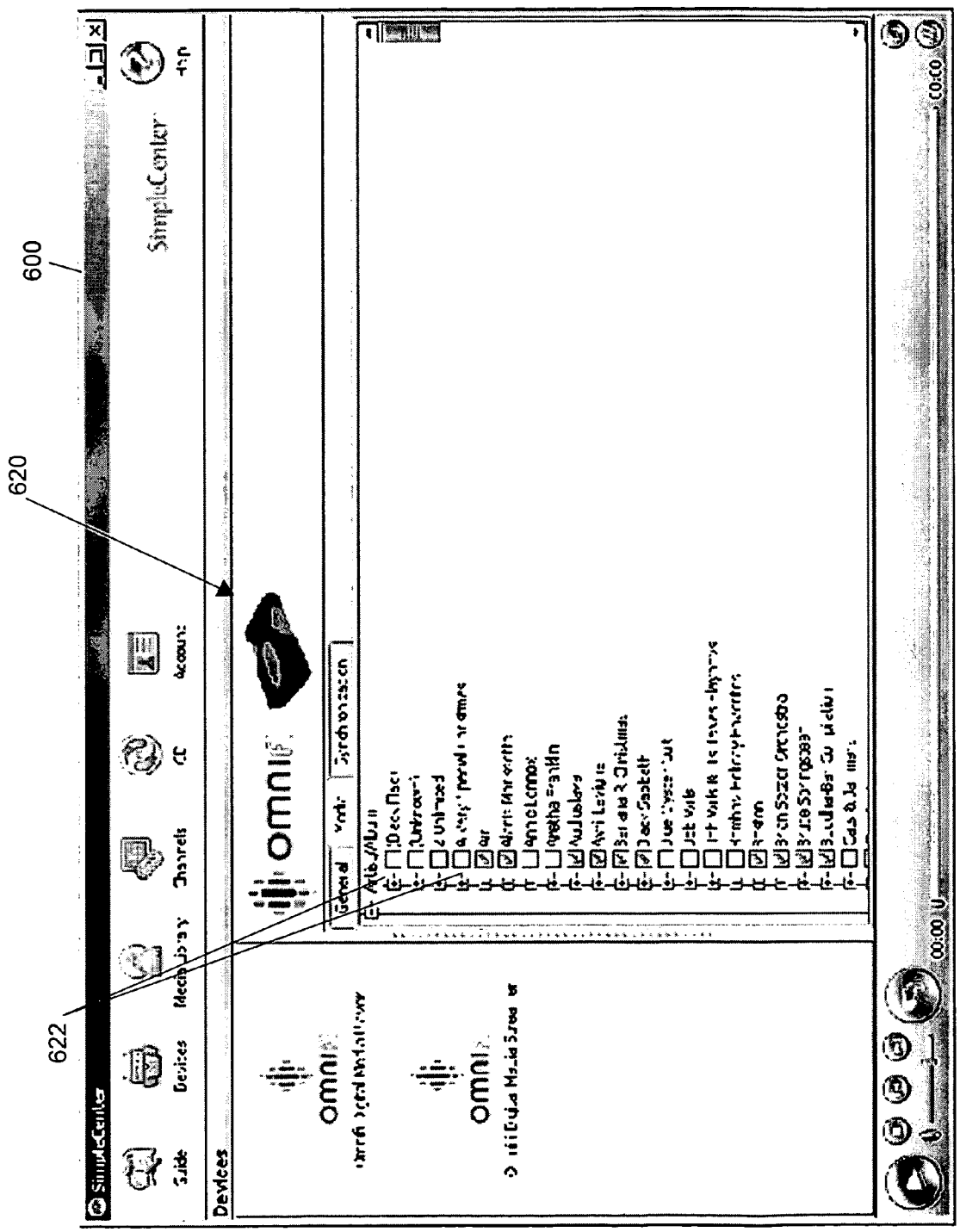
FIG. 10 illustrates an exemplary graphical user interface that provides a plurality of media selection checkboxes.

In one exemplary embodiment, sync server software application may include functions for executing synchronization according to policies or rules that synchronize an exclusive portion of a total number of media files determined by content database parameter (column) filters. FIG. 10 shows an exemplary media selection graphical user interface 620 on a server where a plurality of media selection checkboxes 622 are associated with each artist/album category. These correspond to the artist and album columns in the SQL statement described earlier. Selection (checking) of media selection checkbox 622 causes only those content files whose content database entries match the artist and album selected by the user to be transferred to portable device during the next synchronization. Software logic included in sync server application may execute a query for the selected content files from Internet content servers, if required, and also executes the transfer of content files on server to portable device according to media selections.

Device specific media selection can be executed according to a range of embedded metadata parameters, or according to other data associated with content files that is stored in content database. An example of synchronization based on media selection according to metadata parameters is that a user may select to synchronize all content files that include "jazz" as the genre metadata parameter. Sync server application executes a query for all content database listings with string "jazz" as the value stored in the genre column, and transfers these content files to portable device.

Content files may be synchronized based on subjective user appeal ratings that are input into the graphical user interface by an end user. The subjective ratings are stored in content database 230 and associated with each content file 210 under the userRating parameter shown in the SQL listing illustrated earlier. For example, a user may rate a plurality of content files with a "best" rating. The user may then make a selection using a graphical user interface to select that "best" category or some combination of ratings categories to be exclusively synchronized. Sync server application executes a content database query for all references of a specific rating, and synchronizes the content files with those rating values.

Sync server application may also contain a function that tracks the frequency of play selections for each content file, storing that frequency number in the playCount parameter shown in the SQL listing illustrated earlier. The number of play selections, as well as the time and date of the selections, stored under the playDate parameter, may be stored in the content database. A user may select to synchronize only content items that have been played, for example, within a recent date range. Such a date range may be entered into graphical user interface in system control application.

Sync server application may also contain a function that uses a similarity metric that is applied to content files. Such similarity metrics may utilize a variety of parameters. For example, a similarity metric could be that a specific audio content file includes acoustic guitar recordings. Similarity metric databases are available from a number of suppliers, one such supplier is Savage Beast Technologies, Inc., of Oakland, Calif. Similarity metrics may include algorithmic based operations that generate additional content metadata based on one or more content items selected by a user. For instance, for audio based files similarity metrics may include the capability to selected content files having a similar beat, key, loudness characteristic, etc. for further use in synchronization and acquisition function as described herein. Similarity metric parameters are included in a separate similarity content database cross-referenced to specific content files through the use of the title parameter in content database shown in the SQL listing illustrated earlier. A user may use a graphical user interface that is an aspect of GUI module to make a selection to synchronize content along a specific or a set of specific similarity metrics. Content may also be synchronized based on prioritization of content files, expressed as references in content database. That is, the content files are synchronized in a particular order, based on user preferences. Generally, prioritization is important in two main cases: 1) when the amount of synchronization time available is not sufficient to synchronize all the content to the client device, and 2) when, even after filtering, the amount of data available to be synchronized is greater than the storage capacity of the client device. The amount of time available for synchronization can be limited by: 1) limitations of power supply of the client device; and/or 2) limitations on time available to the user (e.g., user will be within range of the wireless network for just 10 minutes, for example, at a restaurant, airport, gas station, or other location with wireless internet access).

Content files may be prioritized for synchronization based on the size of the content file. In any given period of time, many smaller content files may be synchronized compared to fewer large files. There is also the chance that larger files will not finish transferring before portable device leaves the vicinity of the wireless local area network. File size is a file attribute that is stored in content database under the avsize parameter shown in the SQL listing illustrated earlier and referenced by sync server application according to selections which may be made by a user using a graphical user interface. Sync server application may execute a query that lists the content files for synchronization based on the avsize value, synchronizing the smallest size files first.

Content files may also be prioritized for synchronization based on the creation date of the content file which is stored in the publishDate parameter shown in the SQL listing above. For example, for news items, content files with a newer creation date may be specified as being higher in priority than content files with an older creation date. The process of downloading content files from Internet servers generally includes the communication of creation date values. The sync server application may execute a query that lists the content files for synchronization based on the publishDate value, synchronizing the most recently created content files first.

Content files may be prioritized for synchronization based on the number of references of that item in the content database. For example, if an audio file is listed in a number of playlists, it may be given a higher priority in synchronization. The refObjectId is the parameter that is used in subsequent content database entries (rows) to refer to an original entry of a content file. The sync server application executes a query that computes the number of occurrences of the same refObjectId value, and synchronizes the content files with the greatest occurrence in the content database.

A prioritization graphical user interface may be provided to enable a user to rank prioritization parameters. For example, a user can choose the synchronize files first by creation date and then by file size.

Figure 16:
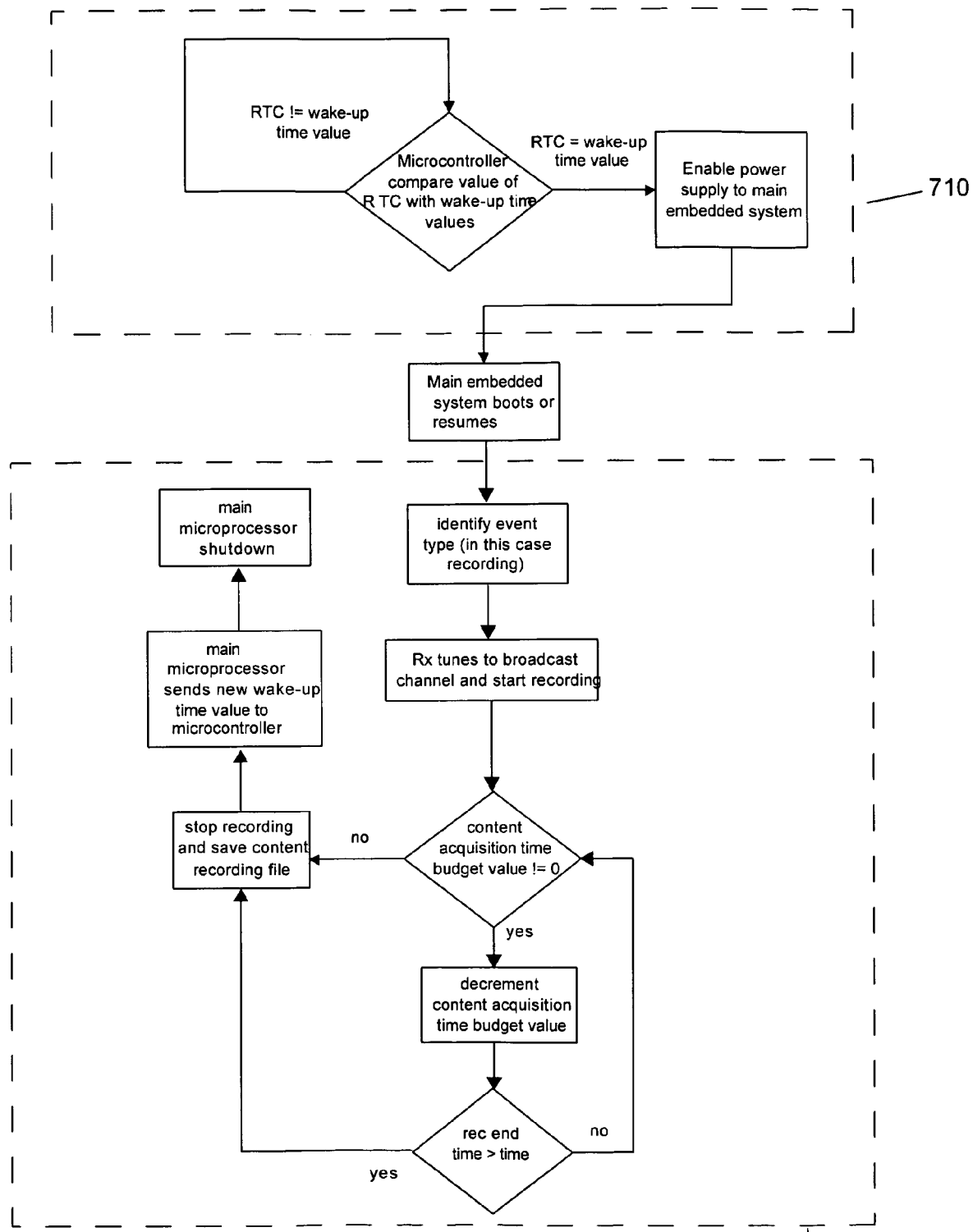
FIG. 16 illustrates an exemplary flowchart showing a scheduled automatic recording process.

The flowchart of FIG. 16 illustrates an exemplary method for content acquisition from a radio receiver. As described earlier, in low power mode 710 the microcontroller 42 in the low-power subsystem 40 periodically compares a wake-up event time value with a Real Time Clock (RTC) value. If the wake up time has passed, the low power computer subsystem 40 enables power to the main computer subsystem 20. In an alternate embodiment, the low power computer system 40 may signal the main computer subsystem 20 to change power mode from a low-power standby mode 710 to the active mode 720 (as illustrated in FIG. 7). Once activated the main computer subsystem 20 boots or resumes operation as described earlier and identifies the event type as a recording request, and the recording mode 760 as illustrated in FIG. 16 is initiated. Recording mode 760 causes portable device 10 to tune to the pre-set radio channel and begin recording the content onto a local storage device. Depending on application the recorded content may be analog or digital. Additionally, the content may be encoded and/or compressed to save storage space.

As recording progresses, the main computer subsystem 20 continuously reduces the available content acquisition budget. If there is no content acquisition budget left, the system saves the already recorded content, resets the time budget, shuts down the main processor and enters the low-power mode 710. If content acquisition budget is still available, it checks for completion of the content recording. If recording is completed or the end time has elapsed, the main computer subsystem 20 saves the file, shuts down the main processor 38, and enters the low-power mode 710.

Figure 17:
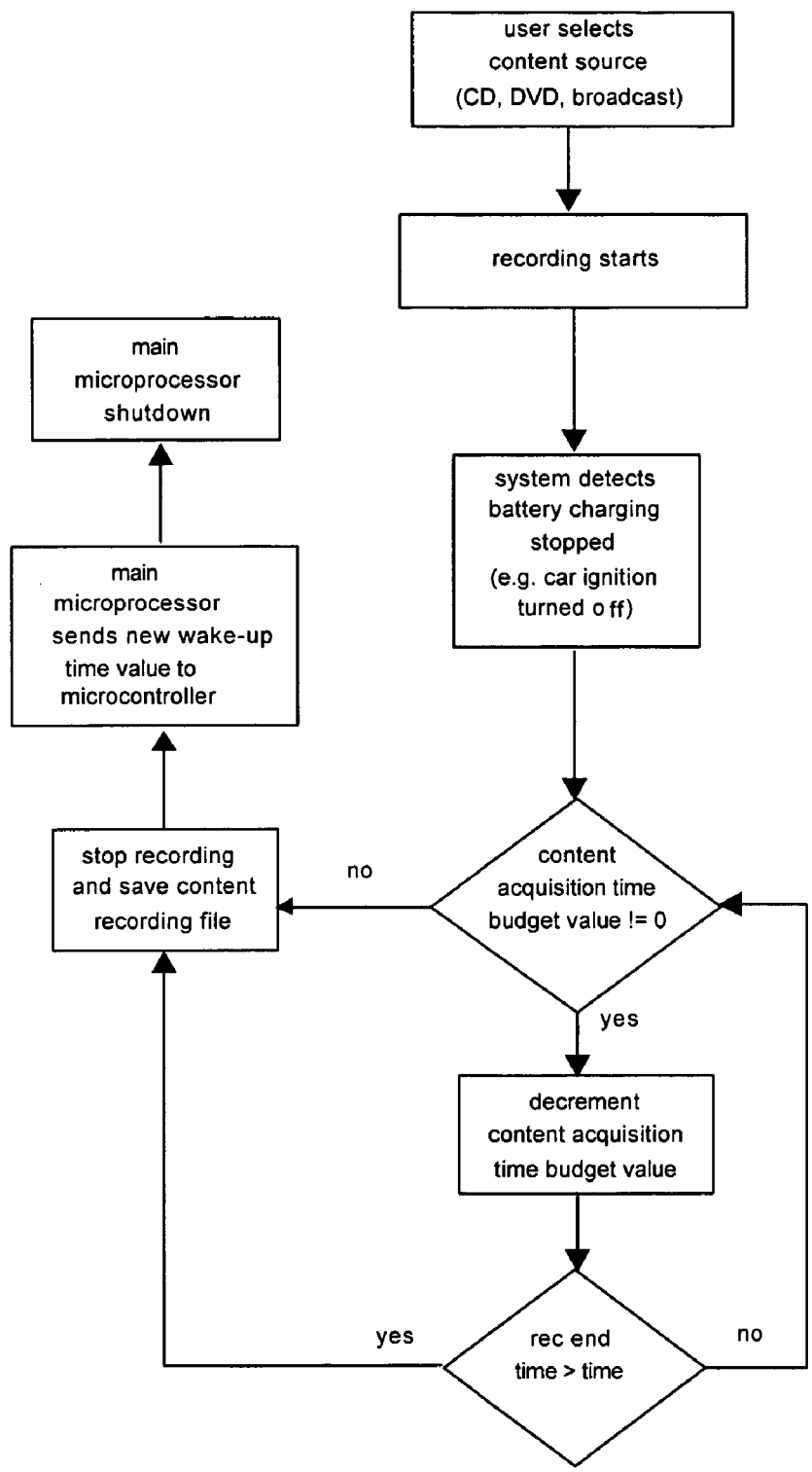
FIG. 17 illustrates an exemplary flowchart showing a manually triggered recording process.

The flowchart of FIG. 17 illustrates an exemplary method for manual content acquisition from a radio receiver or CD/DVD drive. The user may select a recording source (radio or CD according to the current embodiment) and initiate a recording operation. Depending on the application the recorded content may be analog or digital. Additionally, the content may be encoded and/or compressed to save storage space.

If the system detects an interruption of the power supply, for example the ignition is turned off in a car, a portable device is removed from its battery charging cradle, etc., the main computer sub system 20 may commence reducing the available content acquisition budget in the manner previously described in conjunction with FIG. 16. If there is no content acquisition budget left, the system may save the already recorded content, reset the time budget, shut down the main processor 38 and enter the low-power mode 710. If content acquisition budget is still available, it checks for completion of the content transfer. If the content transfer is completed, the main computer subsystem 20 saves the file, shuts down the main processor 38, and puts it into the low-power mode 710.

Portable device content acquisition time is fundamentally limited based on battery power. The length of time for which synchronization or recording may be allowed to occur based on available battery power is defined as the content acquisition budget. In an exemplary embodiment, the content acquisition budget is a numerical value representing units of time and is stored in non-volatile memory on portable device. Calculation of the content acquisition budget may be based on multiple criteria such as time, battery voltage, temperature, device usage, network speed, network location, data payload, etc.

The goal is to balance the power consumption versus the available source to maximize the usability of the device. The content acquisition budget is managed and executed by the sync budget manager, a set of software functions on portable device microprocessor 38, shown in FIG. 4.

In one exemplary embodiment, a time-based implementation, a number of minutes that portable device 10 is permitted to synchronize are calculated and stored as synchronization budget. If portable device 10 is operating (but not executing a synchronization) and battery is not charging, sync budget manager software decreases content acquisition budget value. If portable device battery is being charged, sync budget manager software increases content acquisition budget, up to a maximum value. The rate of increase or decrease of the content acquisition budget, as well as the maximum content acquisition budget value, can be adjusted to fit the hardware limitations of the system, or can be adjusted by user preference. The absolute limit is determined such that synchronization is halted with enough power to spare to complete a system shutdown or to enter low power mode. As an example content acquisition budget algorithm, sync power budget might decrease one minute for each minute of operation when the battery is not charging, and increase five minutes for each minute of operation when the device is charging but not operating. In one alternate embodiment, the synchronization budget manager is configured such that synchronization is halted with enough power left to send appropriate data regarding the present synchronization or content acquisition status to a remote server (via wireless communication means such as WiFi, Bluetooth, GPRS, or traditional mobile phone communication networks) such that additional operations, including in one case resuming content acquisition at the point left off by the portable device, may be performed by the server.

In the case where content synchronization or recording is executed while portable device 10 battery is not charging, the content acquisition budget manager software may include a content acquisition timer function that counts down starting from the initial content acquisition budget value. When the content acquisition timer equals zero, synchronization is halted and portable device 10 either powers down or enters low power mode. If synchronization or recording completes before the content acquisition timer equals zero, the content acquisition budget value is reduced by content acquisition timer value.

In another exemplary embodiment, a voltage adjustment factor might measure the voltage of the source battery and allow operation only above a specified threshold. If the power consumed by the device is not steady, it might be necessary to track actual power consumption as a factor in determining a content acquisition budget. For example, current draw measured on the power supply to the device allows for a more accurate calculation of available power and consumed power.

Many wireless networks have variable range based on the speed of the connection. For example, 802.11b will operate at 11 Mbps at close range, or as low as 2 Mbps at longer distances. An exemplary content acquisition budget management application may includes logic that uses the speed as criteria to determine if synchronization will complete. A calculation can be made in software using the data transfer rate at which the network is operating, and the total payload required to transfer. If the total sync payload cannot be transferred using the allotted or available content acquisition budget, the payload may be revised.

Mobile systems may connect to access points in many locations. In another exemplary embodiment the device may use the connection location to scale back or increase the data transfer. For instance, connections at a gas station or coffee shop are most likely of short duration, so only small data sets may be selected for transfer. Conversely, connection to a home LAN at 2am is likely to be lengthy and is an appropriate time for large-scale transfers.

An exemplary device that synchronizes data may use the size of the data payload as an indicator of overall power required and likelihood of completion. This is particularly important if the device cannot utilize incomplete data structures. For instance, a simple time based budget might suggest that a 45 minute synchronization will complete without depleting the content acquisition budget, but if the temperature is dropping at a rate of 1 degree per minute, an exemplary system elect to abort prior to completion when the temperature limits are included in the budget calculation.

In an exemplary server application, a watch folder is a folder (file system directory) on server that is monitored by system control application at some duty cycle, for example every 10 seconds. The contents of the watch folder are compared every 10 seconds with a list of the contents of watch folder from the previous 10 seconds. If the contents of the watch folder changes, system control application determines if new content files have been added. If content files have been added, this media is then scheduled for transfer to an associated portable device during the next synchronization, according to synchronization rules and policies described above.

Figure 12:
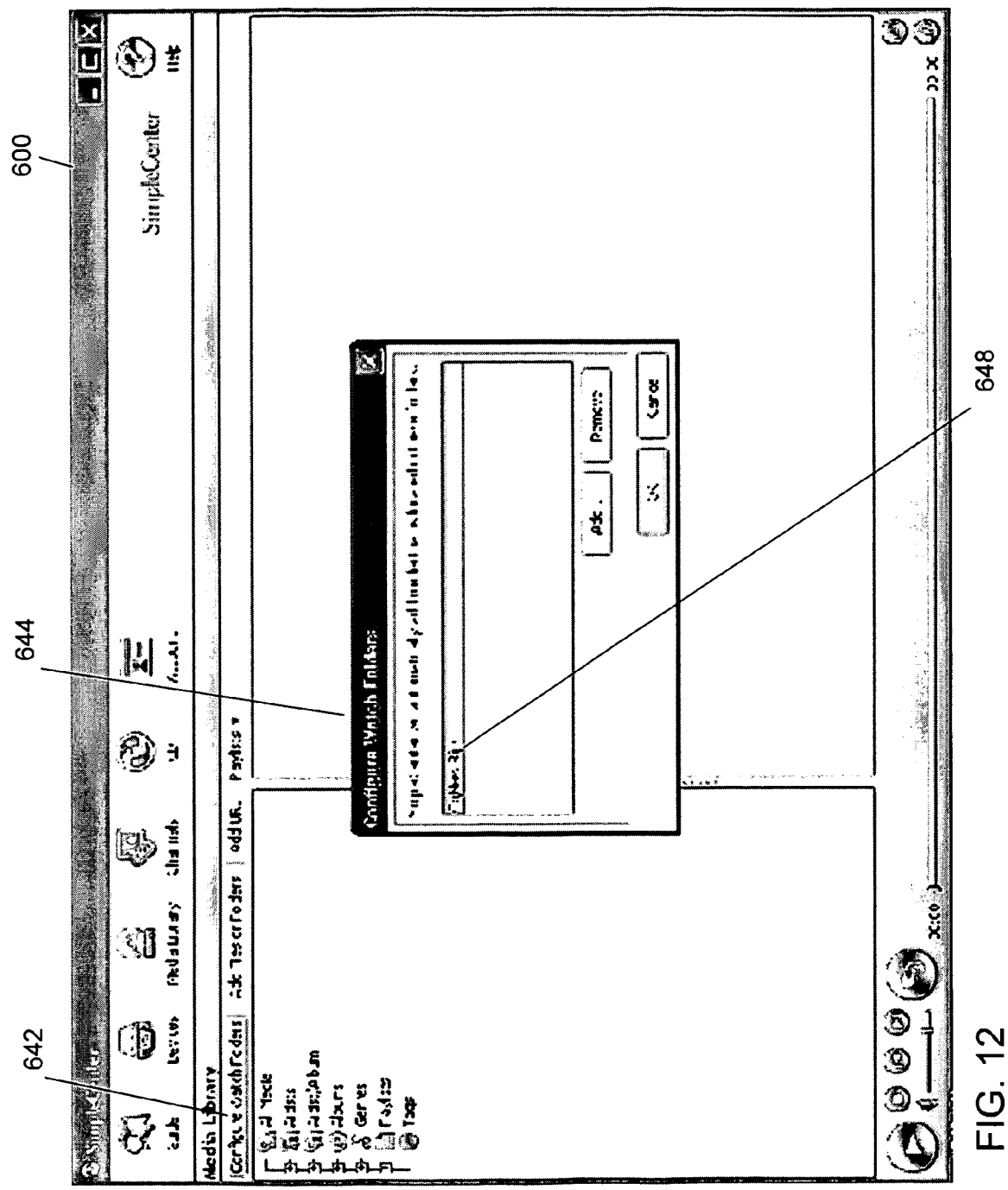
FIG. 12 illustrates an exemplary graphical user interface for selecting a watch folder.

FIG. 12 illustrates an exemplary graphical user interface of such a watch folder system control application. The watch folder dialog box 644 may be launched by selecting the watch folder button 642. The user may navigate to any folder and select it to be designated to be monitored for new content files. In the exemplary user interface, designated watch folders 648 are listed in the watch folder dialog box.

In a contemplated exemplary embodiment the microcontroller 42 of low power computer subsystem 40 includes logic to distinguish between the vehicle ignition turned on versus a wakeup due to a content acquisition time value match. Therefore, a synchronization is not executed when the car is started. Sync client application includes software logic that attempts synchronization in the following mobile device states: (1) every time the automobile's ignition is turned off, (2) at a time fixedly programmed into the sync client application, for example, 2AM, (3) at one or more user specified times, as previously described in conjunction with FIG. 6, and (4) when activated manually by user using mobile device user interface.

In this instance, the exemplary mobile player device is connected to a car battery in a vehicle. By way of further illustration of the various factors which may be taken in account in determining a content acquisition budget, the following rules may govern the operation of such a device:

1) Never operate below 11.5 VDC;
2) Never operate below −10 degrees Celsius or above 65 degrees Celsius;
3) Decrease the power budget by 50% if the ambient temperature is below 10 C;
4) If the data transfer cannot complete with the content acquisition budget available, do not start the operation; and/or
5) If the voltage is below 12VDC, reduce the content acquisition budget increase (during charging) by 75%.

The device may also infer from the voltage whether the car is charging, and determine if it should operate. A positive rate of change in voltage would suggest charging, a negative rate of change would indicate the battery is not charging.

Temperature can affect both the charge rate and total capacity of many types of batteries. A content acquisition budget may use the measurement of ambient temperature or actual battery temperature to adjust the total allocated power for device operation.

While various concepts have been described in detail, it will be appreciated by those skilled in the art that various modifications and alternatives to those concepts could be developed in light of the overall teachings of the disclosure. For example, it should be appreciated that various configurations of battery-powered devices and servers or other similar electronic devices may be implemented in an automatic synchronization and content acquisition system, and as such many combinations and variations of the above described application GUIs, synchronization settings, content acquisition methods and parameters, and power budget methods and systems are possible without departing from the spirit and scope of the present invention. Additionally, while the embodiments presented above are described primarily in the context of battery-powered portable devices having audio recording and synchronization capabilities as being most broadly representative of a device for which synchronization and content acquisition system and method of the present invention is most applicable, it will be appreciated that the teachings of this disclosure may be equally well applied to other devices and media types wherein synchronization and content acquisition functions are required (e.g., line powered electronic devices such as STB's, media renderers, and personal computers) without departing from the spirit and scope of the present invention. As such, the particular concepts disclosed are meant to be illustrative only and not limiting as to the scope of the invention which is to be given the full breadth of the appended claims and any equivalents thereof.

All documents cited within this application for patent are hereby incorporated by reference in their entirety.

What is claimed is:

1. For use in connection with a battery-powered device, a method of downloading media content from a media content server comprising:
   establishing a period of time during which the battery-powered device is allowed to download media content from the media content server; and
   adjusting the period of time during which the battery-powered device is allowed to download media content from the media content server as a function of a state of a battery associated with the battery-powered device.

2. The method as recited in claim 1, wherein the state of the battery comprises the battery being charged.

3. The method as recited in claim 1, wherein the state of the battery comprises the battery being discharged.

4. The method as recited in claim 1, comprising adjusting the period of time in response to the battery-powered device downloading media content from the media content server.

5. The method as recited in claim 4, comprising using a threshold value for the period of time to halt the battery-powered device downloading media content from the media server.

6. The method as recited in claim 1, comprising using a threshold value for the period of time to prevent the battery-powered device from downloading media content from the media server.

7. The method as recited in claim 1, comprising using a measure of a state of the battery associated with the battery-powered device to enable the battery-powered device downloading media content from the media content server.

8. The method as recited in claim 1, comprising using a measure of content size to enable the battery-powered device downloading media content from the media content server.

9. The method as recited in claim 1, comprising using a measure of media content file size to determine which content the battery-powered device will download from the media content server in the period of time during which the battery-powered device is allowed to download media content from the media content server.

10. The method as recited in claim 1, comprising using a measure of data transfer rate to enable the battery-powered device downloading media content from the media content server.

11. The method as recited in claim 1, comprising using a measure of data transfer rate to determine which media content the battery-powered device will download from the media content server in the period of time during which the battery-powered device is allowed to download media content from the media content server.

12. The method as recited in claim 1, comprising adjusting the period of time during which the battery-powered device is allowed to download content from the media content server as a function of a temperature associated with the battery-powered device.

13. The method as recited in claim 1, comprising using a measure of temperature to enable the battery-powered device downloading media content from the media content server.

14. The method as recited in claim 1, comprising adjusting the period of time as a function of a measure of a state of a battery within the battery-powered device.

15. The method as recited in claim 1, comprising using a filter to determine which media content the battery-powered device will download from the media content server in the period of time during which the battery-powered device is allowed to download media content from the media content server.

16. The method as recited in claim 15, wherein the filter comprises one or more media content genres.

17. The method as recited in claim 15, wherein the filter comprises one or more media ratings categories.

18. The method as recited in claim 15, wherein the filter comprises one or more media content play dates.

19. The method as recited in claim 15, wherein the filter comprises one or more media content publication dates.

20. For use in connection with a battery-powered device, a method of downloading media content from a media content server comprising:
measuring a state of a battery associated with the battery-powered device; and
using the measure of the state of the battery associated with the battery-powered device to determine if the battery-powered device is to be enabled to download media content from the media content server.

21. The method as recited in claim 20, wherein the state of the battery comprises a voltage level.

22. The method as recited in claim 20, wherein the state of the battery comprises a current level.

23. The method as recited in claim 20, wherein the state of the battery comprises a battery charge time.

24. The method as recited in claim 20, wherein the state of the battery comprises a battery discharge time.

25. An apparatus comprising:
a battery providing power, and
a content acquisition budget manager that determines a length of time to download media content from a media content server and that adjusts the length of time to download the media content from the media content server as a function of a state of the battery.

26. The apparatus as recited in claim 25 further comprising a filter to determine which media content is acquired.

27. The apparatus as recited in claim 25 wherein the content acquisition budget manager uses content size of the media content as a factor in adjusting the length of time to download the media content.

28. The apparatus as recited in claim 25 wherein the state of the battery comprises a voltage level.

29. The apparatus as recited in claim 25 wherein the state of the battery comprises a battery charge time.

30. A system comprising:
means for establishing a period of time during which a battery-powered device is allowed to download media content from the media content server; and
means for adjusting the period of time during which the battery-powered device is allowed to download media content from the media content server as a function of a state of a battery associated with the battery-powered device.

31. The system as recited in claim 30, further comprising means for adjusting the period of time in response to the battery-powered device downloading media content from the media content server.

32. The system as recited in claim 31, further comprising means for using a threshold value for the period of time to halt the battery-powered device downloading media content from the media server.

33. The system as recited in claim 30, further comprising means for using a threshold value for the period of time to prevent the battery-powered device from downloading media content from the media server.

34. A computer-readable medium having computer-executable instructions stored thereon, that, if executed by a computing device, cause the computing device to:
establish a period of time during which a battery-powered device is allowed to download media content from a media content server; and
adjust the period of time during which the battery-powered device is allowed to download media content from the media content server as a function of a state of a battery associated with the battery-powered device.

35. The computer-readable medium as recited in claim 34, wherein the computing device is further caused to adjust the period of time in response to the battery-powered device downloading media content from the media content server.

36. The computer-readable medium as recited in claim 35, wherein the computing device is further caused to use a threshold value for the period of time to halt the battery-powered device downloading media content from the media server.

37. The computer-readable medium as recited in claim 34, wherein the computing device is further caused to use a threshold value for the period of time to prevent the battery-powered device from downloading media content from the media server.

* * * * *